(12) United States Patent
Ji et al.

(10) Patent No.: US 7,869,711 B2
(45) Date of Patent: Jan. 11, 2011

(54) OPTICAL TUNABLE ASYMMETRIC INTERLEAVER AND UPGRADE FOR DENSE WAVELENGTH DIVISION MULTIPLEXED NETWORKS

(75) Inventors: Philip Nan Ji, Princeton, NJ (US); Ting Wang, Princeton, NJ (US); Arthur Dogariu, Hamilton, NJ (US); Lei Zhong, Plainsboro, NJ (US); Osamu Matsuda, Chiba (JP); Yuji Abe, Tokyo (JP)

(73) Assignees: NEC Laboratories America, Inc., Princeton, NJ (US); NEC Corporation, Tokyo (JP)

( * ) Notice: Subject to any disclaimer, the term of this patent is extended or adjusted under 35 U.S.C. 154(b) by 701 days.

(21) Appl. No.: 11/550,481

(22) Filed: Oct. 18, 2006

(65) Prior Publication Data
US 2007/0116468 A1  May 24, 2007

Related U.S. Application Data

(60) Provisional application No. 60/727,694, filed on Oct. 18, 2005.

(51) Int. Cl.
*H04J 14/02* (2006.01)
*H04J 14/00* (2006.01)

(52) U.S. Cl. ............... 398/79; 398/43; 398/82
(58) Field of Classification Search ............ 398/7, 398/42, 45, 48, 53, 52, 68, 66, 79, 128, 130, 398/135, 140, 82, 43; 359/279, 301; 385/24, 385/39
See application file for complete search history.

(56) References Cited

U.S. PATENT DOCUMENTS

| 6,563,987 | B1 * | 5/2003 | Takahashi | ............. 385/39 |
| 6,684,006 | B2 * | 1/2004 | Zhao | ............. 385/24 |
| 7,480,459 | B2 * | 1/2009 | Nakamura et al. | ............. 398/83 |
| 2003/0072522 | A1 * | 4/2003 | Zhao | ............. 385/27 |
| 2003/0202232 | A1 * | 10/2003 | Frignac et al. | ............. 359/279 |
| 2004/0207902 | A1 * | 10/2004 | Koch et al. | ............. 359/301 |

* cited by examiner

*Primary Examiner*—M. R. Sedighian
(74) *Attorney, Agent, or Firm*—Jeffery Brosemer; Joseph J. Kolodka

(57) ABSTRACT

A tunable asymmetric interleaver constructed from two symmetric interleavers in series, wherein either or both of the individual symmetric interleavers exhibit a wavelength shifting ability. Advantageously, tunable asymmetric interleavers so constructed provide continuous tunable interleaving ratios from 0:100 to 50:50 to 100:0 and provide attractive upgrade paths for existing and future DWDM networks and applications.

9 Claims, 32 Drawing Sheets

Tunable asymmetric/shift interleavers

US 7,869,711 B2

OPTICAL TUNABLE ASYMMETRIC INTERLEAVER AND UPGRADE FOR DENSE WAVELENGTH DIVISION MULTIPLEXED NETWORKS

CROSS REFERENCE TO RELATED APPLICATIONS

This application claims the benefit of U.S. Provisional Patent Application No. 60/727,694 filed Oct. 18, 2005 the entire contents and file wrapper of which are incorporated by reference as if set forth at length herein.

FIELD OF THE INVENTION

This invention relates generally to the field of optical networking and in particular relates to an optical tunable asymmetric interleaver modulator for use in dense wavelength division multiplexed (DWDM) optical transmission systems.

BACKGROUND OF THE INVENTION

Recently, the spreading and maturing of Internet technology and the resultant growth of business and personal applications has fueled demand for bandwidth and services in both telecommunications and data communications. Fiber optic communications systems—and in particular Dense Wavelength Division Multiplexed (DWDM) fiber optic communications systems—have become a key component in many solutions to this demand.

Dense Wavelength Division Multiplexing technology allows data signals from different sources to be simultaneously transmitted on one single optical fiber, where each signal is carried on its own separate light wavelength. As is known, the signal sources can be Synchronous Optical Network (SONET) or Synchronous Digital Hierarchy (SDH) data, Internet (IP) data, Asynchronous Transfer Mode (ATM) data, Fiber Channel data or others.

As a result of this DWDM technology, greater bandwidth can be provided in a single optical fiber. For example, if OC-192 SONET signals are multiplexed and transmitted on a 50 GHz spaced DWDM system across the whole C and L transmission band, each fiber can deliver 1.6 trillion bits of data per second. As a result of this enormous capacity, DWDM is viewed as a solution to the "fiber exhaust" problem and is believed to be an essential component of future all-optical networks.

Since individual wavelengths (optical channels) are densely packed spectrally in DWDM systems, operations performed on individual optical channel requires functions such as filtering, demultiplexing, multiplexing and coupling. Devices that perform these functions on the wavelength domains are essential to DWDM networks. Such devices include for example, optical filters, gain equalizers, wavelength blockers, and wavelength selective switches, among others.

Another important device used in such systems employing dense channel spacings is an optical interleaver. An optical interleaver segregates a group of channels into odd and even sets with doubled channel spacing. Given its importance to DWDM optical networks, a continuing need exists for optical interleavers exhibiting improved characteristics.

SUMMARY OF THE INVENTION

An advance is made in the art according to an aspect of the present invention wherein a tunable asymmetric interleaver is constructed from two symmetric interleavers in series, wherein either or both of them exhibit a wavelength shifting ability. Advantageously, tunable asymmetric interleavers constructed according to the present invention continuously provide tunable interleaving ratios from 0:100 to 50:50 to 100:0. Experimental units so constructed show good tunability with high precision and wavelength accuracy and are satisfactory for most DWDM network applications.

According to one aspect of the present invention, an interleaver that offers both passband frequency shifting and asymmetric ratio adjusting capabilities is produced. As a result, it is called tunable asymmetric interleaver (TAI).

DESCRIPTION OF THE DRAWING

Further features and aspects of the present invention may be understood with reference to the accompanying drawing in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
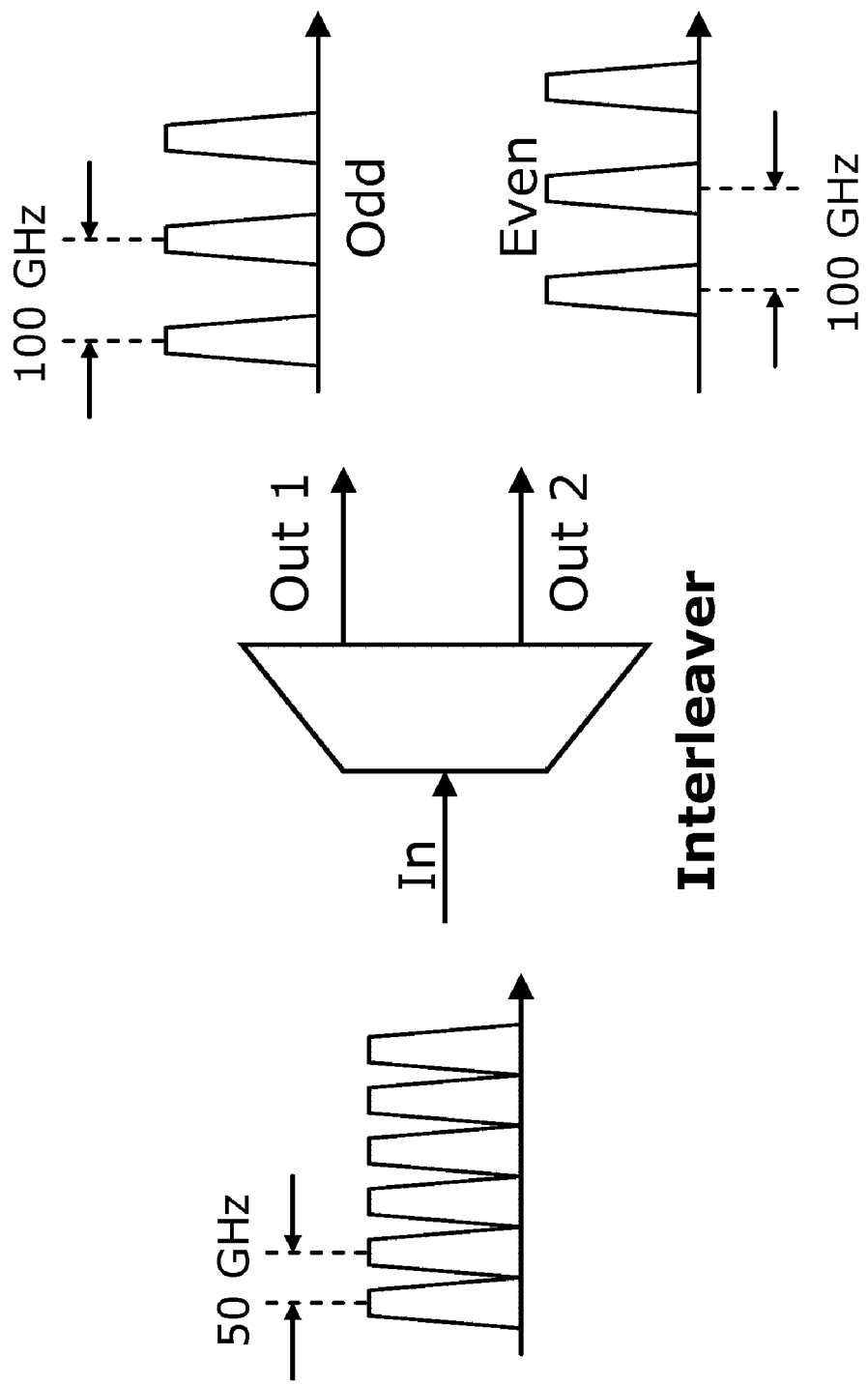
FIG. 1 is a schematic showing the operation of a 50 G/100 G interleaver.

Turning now to FIG. 1, there it shows schematically the operation of a 50 G/100 G optical interleaver which may segregate a group 50 GHz spacing channels into 2 groups of channels, each with 100 GHz spacing. Given these characteristics, such a device is commonly called a "comb filter". In a common implementation an interleaver acts as a passive device that allows light to travel in both directions, consequently it performs both interleaving and de-interleaving functions.

Figure 2:
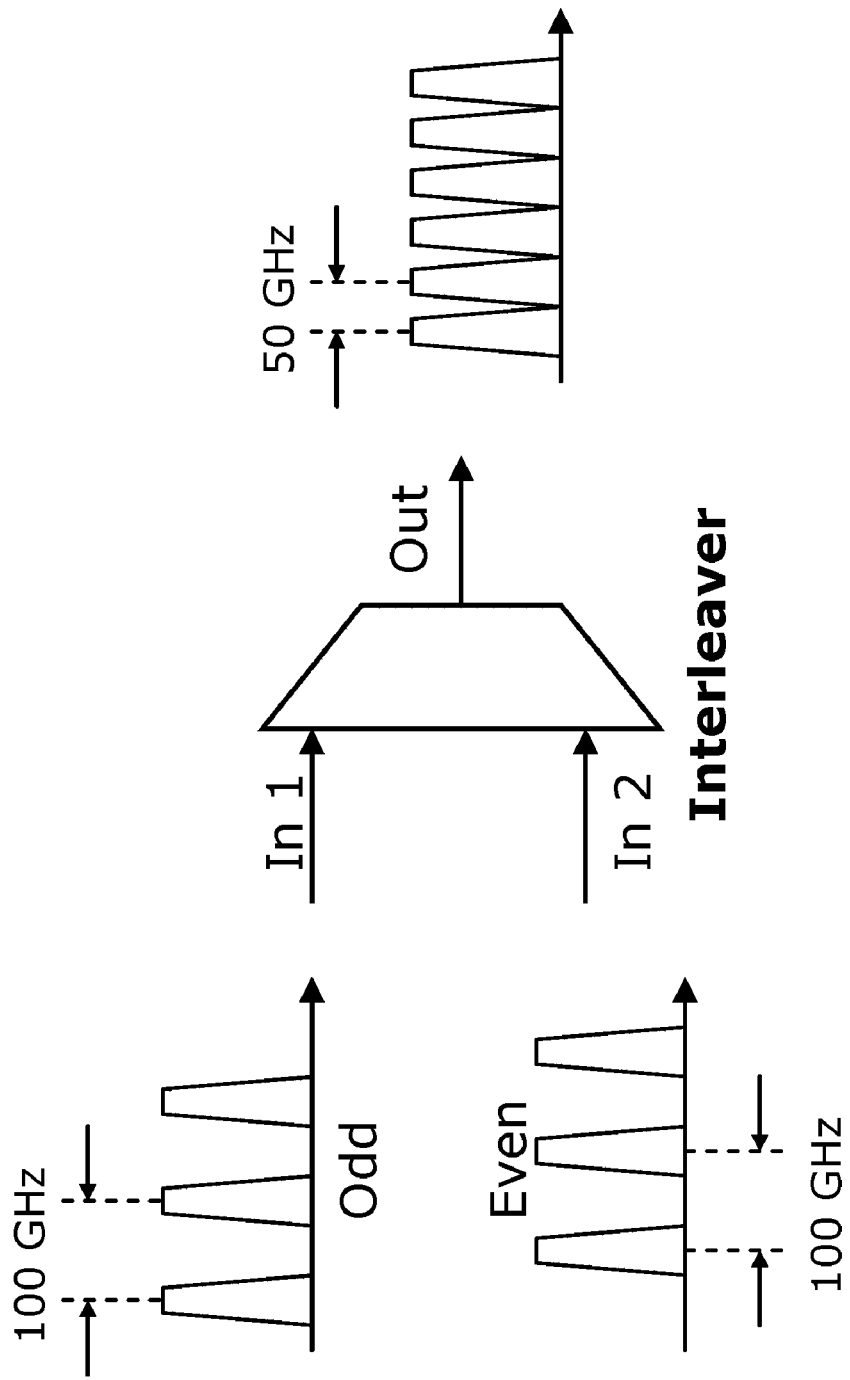
FIG. 2 is a schematic showing the operation of the 50 G/100 G interleaver of FIG. 1 in reverse direction.

Using the same example shown above, but with reference now to FIG. 2, a similar or the same 50/100 GHz optical interleaver may be used in the reverse direction to combine 2 groups of 100 GHz spacing channels into one group with 50 GHz spacing, provided that the 2 input channel groups sufficiently fall into its odd and even spectral grids.

Figure 3:
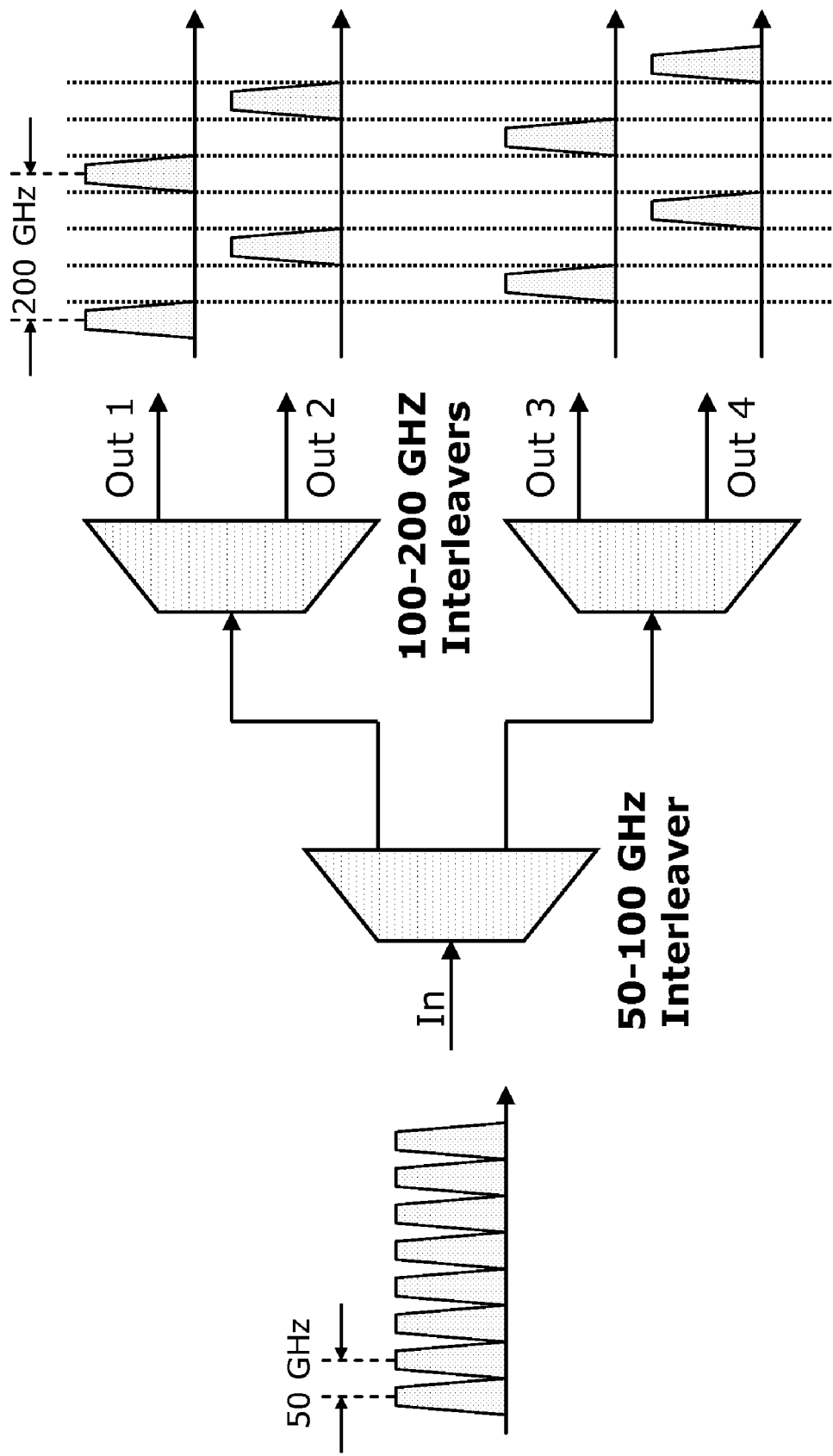
FIG. 3 is a schematic showing cascaded interleavers according to the present invention.

Advantageously, optical interleavers may also be placed in cascade to further de-interleave or interleave optical channels into finer or coarser groups. For example, if a 100/200 GHz interleaver is placed at each output of the system shown in FIG. 1, each 100 GHz spacing output can be further separated into 2 groups of channels with 200 GHz spacing as shown schematically in FIG. 3.

Since the standard DWDM wavelength assignment by International Telecommunications Union (ITU) is based on grids with double density (such as 200 GHz, 100 GHz, 50 GHz and even 25 GHz), optical interleavers provide a convenient vehicle by which to connect systems having different grid density (channel spacing) and are essential for system capacity upgrades. For example, if a 50/100 GHz optical interleaver is inserted at a DWDM transmission link utilizing 100 GHz spacing, the link can be upgraded to a 50 GHz system without affecting the existing traffic and without replacing the existing 100 GHz equipments and modules. Additionally, since the DWDM transmission link has a limited optimum spectral window and optical devices have an operation bandwidth limitation (such as the working range of the Erbium-doped fiber amplifier, a key element in the DWDM transmission system), the 100 G to 50 G upgrade is an effective way to double the channel number (and hence the data transmission capacity).

Generalized Requirements for Optical Interleavers

For an optical interleaver to deliver satisfactory performance in a DWDM network, there are several interleaver characteristics that must be present. More particularly, the optical interleaver should sufficiently exhibit a square-like spectral profile. Such a sufficient square-like profile includes a flat passband top, a wide passband width, and steep passband edges at both sides. An optical interleaver exhibiting such a square-like spectral profile will be less sensitive to wavelength shift of the optical source that arises from poor laser quality or temperature variation. It will also allow more levels of interleavers in cascade while maintaining the filter passband width.

Additionally, insertion loss for an optical interleaver should be low, and high isolation is desirable. When an optical interleaver exhibits such characteristics, crosstalk between Odd and Even channels is reduced.

Furthermore, dispersion figures for an optical interleaver should be low, especially when very high bit rate of traffic is transmitted in each DWDM channel. Such low dispersion figures should include low chromatic dispersion, low polarization mode dispersion and low polarization dependent loss.

Finally, an optical interleaver must be reliable and low cost. Of particular importance to reliability metrics are easy alignment, easy integration with an optical transmission link, insensitive to environmental change such as temperature variations, insensitive to vibrations and mechanically robust while exhibiting a minimal footprint.

Technologies for Optical Interleavers

While optical interleavers are generally based on optical interferometer principles, those skilled in the art will readily appreciate that many different technologies innovations may go into the development of an optical interleaver. For example, contemporary interleavers may include an interferometer exhibiting: a Mach-Zehnder or Michelson structure(s) (See, e.g., Q. Wang, S. He, *Optimal Design of a Flat-Top Interleaver Based On Cascaded M-Z Interferometers by Using a Genetic Algorighm*, Optics Communications, Vol. 224, 2003, pp. 229-236; Q. Yang, Y. Zhang and Y. C. Soh, *All Fiber 3×3 Interleaver Design with Flat-Top Passband*, IEEE Photonics Technology Letters, Vol. 16, No. 1, 2004, pp. 168-

170; T. Zhang, K. Chen and Q. Sheng, *A Novel Interleaver Based on Dual-Pass Mach-Zehnder Interferometer*, Microwave and Optical Technology Letters, Vol. 42, No. 3, 2004, pp. 253-255; C-H. Huang, Y. Li, et. Al., *Low-Loss Flat-Top 50-Ghz DWDM and Add/Drop Modules Using All-Fiber Fourier Filters*, Proceedings of NFOEC, 2000, pp. 311-316; F. Liang, H. Zeng, et. Al., *A Bulk Optical Interleaver with Flat Passband by Using Cascaded Mach-Zehncer Interferometers*, Optical Components and Transmission System, Proceedings of SPIE, Vol. 4906, 2002, pp. 442-452; H. Li, R. Huang, *The Application and Technical Approaches of Interleaver*, Passive Components and Transmission Systems, Proceedings of SPIE, Vol. 4581, pp. 79-87; J. Shi, X. Chen, et. Al., *Design of Polarization-Based Interleaver Filter for DWDM Mux/Demux*, Passive Components and Transmission Systems, Proceedings of SPIE, Vol. 4581, pp. 348-355; J. Zhang, L. Liu and Y. Zhou, *A Tunable Interleaver Filter Based on Analog Birefringence Units*, Opticas Communications, Vol. 227, 2003, pp. 283-294; H. Arai, T. Chiba, et. Al., *Interleave Filter with Box-Like Spectral Response and Low Chromatic Dispersion*, Proceedings of NFOEC, Vol. 2, 2000, pp. 444-451; E. Sidick, P. Peters, et., al., *Highly Integrated and Scalable PLC Interleeaver Modules*, Optical Fiber and Planar Waveguide Technology II, Proceedings of SPIE, Vol. 4904, 2002, pp. 80-87); arrayed waveguide grating (AWG) structures (See, e.g., d-W. Huang, T-H. Chiu and Y Lai, *Arrayed Waveguide Grating DWDM Interleaver*, Proceedings of OFT, Vol. 3, 2001, pp. WDD80-1-3); coupled resonator structures including fiber grating or etalon structures (See, e.g., L. Lin, F. Zujie, et. Al., *Sampled FBG Based Optical Interleaver*, Technical Digest of CLEO, Vol. I, 2001, pp. I-404-405; and H. Chen, P. Gu, et al., *Optical Interleaver Based on Multi-Cavity Fabry-Perot Thin Film Filter*, Optical Components and Transmission System, Proceedings of SPIE, Vol. 4906, 2002, pp. 561-566), resonance-based interferometer structures (See e.g., C-H. Hsieh, R. Wang, et., al., *Flat-Top Interleavers Using Two Gires-Tournois Etalons as Phase-Dispersive Mirrors in a Michelson Interferometer*, IEEE Photonics Technology Letters, Vol., 15, No. 2, 2003, pp. 242-244; Y. Shao, Y. Jiang, et. al., *Research of a Novel Interleaver Basing on Modified Michelson Interferometer with Three-Mirror Fabry-Perot Interferometer and Gires-Tournois Resonator*, Optical Components and Transmission System, Proceedings of SPIE, Vol. 4906, 2002, pp. 484-488; and B. Zhang, D. Huang, *BGT Interleaver Used in DWDM Optics Communications System*, Optical Components and Transmission Systems, Proceedings of SPIE, Vol., 4906, 2002, pp. 493-497), and finally ring resonator structures (See., e.g., C. J. Kalalnd, Z. Jin, et. al., *Novel Optical Wavelength Interleaver Based on Symmetrically Parallel-Coupled and Apodized Ring Resonator Arrays*, Photorefractive Fiber and Crystal Devices, Proceedings of SPIE, Vol., 5206, 2003, pp. 157-165.).

As implemented, the interleavers described in these references exhibit a variety of component technologies. For example, certain interleavers exhibit an all fiber structure, e.g., fiber Bragg grating and fiber ring resonator; some employ planar lightwave circuits, e.g., PLC-based; some have thin film components; some employ free space optics for the interferometer; some use a birefringent crystal for the interferometer; and some have combination of more than one structures.

Figure 4:
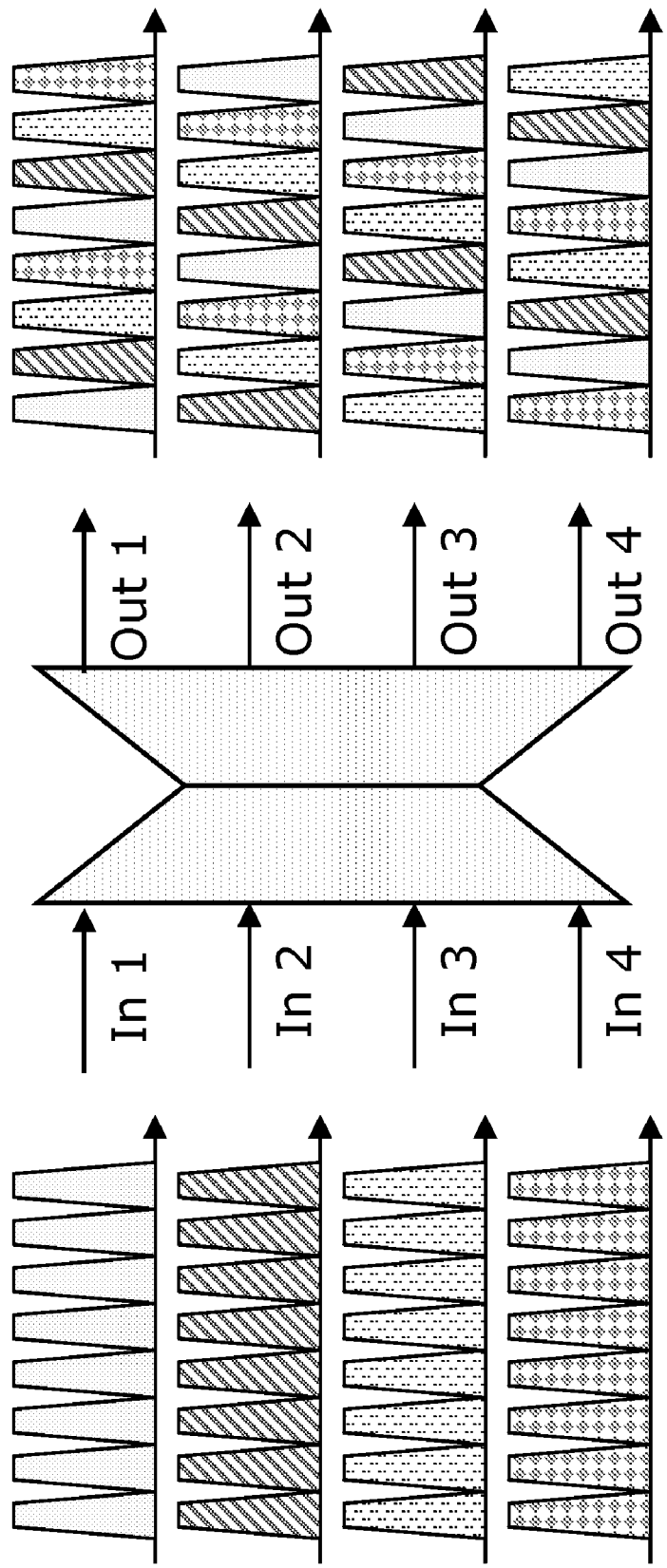
FIG. 4 is a schematic showing the operation of a 4×4 cyclic interleaver according to the present invention.

Furthermore—and in terms of the output ports—some interleavers have 2 outputs (Odd and Even), while some have higher number of ports (either by cascading interleavers with different free spectral ranges, or integrated structure such as AWG); and some interleavers have cyclic structures. Finally, with reference now to FIG. 4 which shows a schematic of a 4×4 cyclic interleaver, it may be appreciated that such an n×n cyclic interleaver integrates n units of 1×n or n×1 interleavers with a cyclic shift of n output ports.

Of course, each of the different interleaver technologies and implementations offer characteristic strengths and weaknesses. For example, simple single stage Mach-Zehnder or Michelson interferometer type interleaver cannot deliver flat-top spectral response, a desirable feature in DWDM system. This can be improved by adding interferometers in cascade; however the insertion loss of the device will also increase accordingly.

Resonance-based interleaver (such as FBG-based, thin film-based, Michelson interferometer with Gires-Tournois resonator, and Mach-Zehnder interferometer with ring resonator) can achieve good spectral response with small loss. However the resonance effect oftentimes leads to higher chromatic dispersion and therefore requires additional dispersion compensation mechanism (See, e.g., b. b. Dingel, *Recent Development of Novel Optical Interleaver: Performance and Potental*, Active and Passive Optical Components for WDM Communications, Proceedings of SPIE, Vol. 5246, 2003, pp. 570-581).

Non-Conventional Interleavers

Despite differences in the technologies, design and implementation employed, conventional optical interleavers are generally passive fixed wavelength devices. In particular, the free spectral range (FSR) of the interleaver output is fixed. In DWDM applications, the FSR value is usually 25 GHz, 50 GHz, 100 GHz or 200 GHz.

Additionally, center frequencies (or wavelengths) of an interleaver output's passbands are pre-determined. As a result during the manufacturing process, the optics of the interleaver is fine tuned so that the center will fall on the standard ITU-T grid. Finally, the passband splitting ratio of the interleaver outputs is always 50:50. In other words, the passband of an Odd channel has the same passband width as the passband of an even channel.

As the application in DWDM network broadens, additional features such as wavelength tunability and asymmetry of the passbands will be desirable for interleavers. Consequently, non-conventional interleavers are required and begin to emerge. Table 1 lists several types of non-conventional interleavers and their spectral behaviors are compared.

As can be appreciated, a tunable shift interleaver allows the center wavelength/frequency of the passband to be tuned (shifted left or right). However the FSR of the interleaver outputs and the Odd/Even passband distribution ratio are not changed. Fortunately, this can be achieved by rotating cascaded analog birefringent units consisting of birefringent plates, medium block and half wave plate.

Another method is to adjust the resonator in the resonator-based interferometer structure. For example, the length of a Gires-Tournois cavity can be adjusted in a Michelson Gires-Tournois (MGT) interferometer to achieve center wavelength tuning.

As will be shown, the tunable asymmetric interleaver mechanism which is an aspect of the present invention and such a tunable shift interleaver may be used during the manufacturing process to align the interleaver outputs to the ITU-T grid. Once the output center frequency reaches the ITU-T grid, the tuning mechanism is locked to maintain the wavelength accuracy.

TABLE 1

| Interleaver Type | | Period (FSR) tunable? | Center wavelength tunable? | Interleaving ratio | Odd/Even outputs switchable? |
|---|---|---|---|---|---|
| Conventional interleaver | | No | No | Fixed symmetric (50:50) | No |
| Tunable shift interleaver | | No | Yes | Fixed symmetric (50:50) | Yes |
| Fixed asymmetric interleaver | | No | No | Fixed asymmetric (e.g. 80:20) | No |
| Tunable asymmetric interleaver | Single-edge | No | No* | Symmetric or asymmetric | No |
| | Dual-edge | No | Yes | Symmetric or asymmetric | Yes |
| Period tunable interleaver | | Yes | No* | Fixed symmetric (50:50) | No |

As the application in DWDM network broadens, additional features such as wavelength tunability and asymmetry of the passbands will be desirable for interleavers. Consequently, non-conventional interleavers are required and begin to emerge. Table 1 lists several types of non-conventional interleavers and their spectral behaviors are compared.

A fixed asymmetric interleaver has been described (See, e.g., S. X. F. Cao, X. Mao, *Dense Wavelength Division Multiplexer Utilizing an Asymmetric Pass Band Interferometer*, U.S. Pat. No. 6,310,690). By setting appropriate thickness of optical retardances and reflectivity of the reflective coating in the interferometer components in the interleaver, different Odd/Even splitting ratio can be obtained. However this is a fixed structure, that is, the center frequency of the passbands and the asymmetry ratio cannot be adjusted once the interleaver is manufactured.

Figure 5:
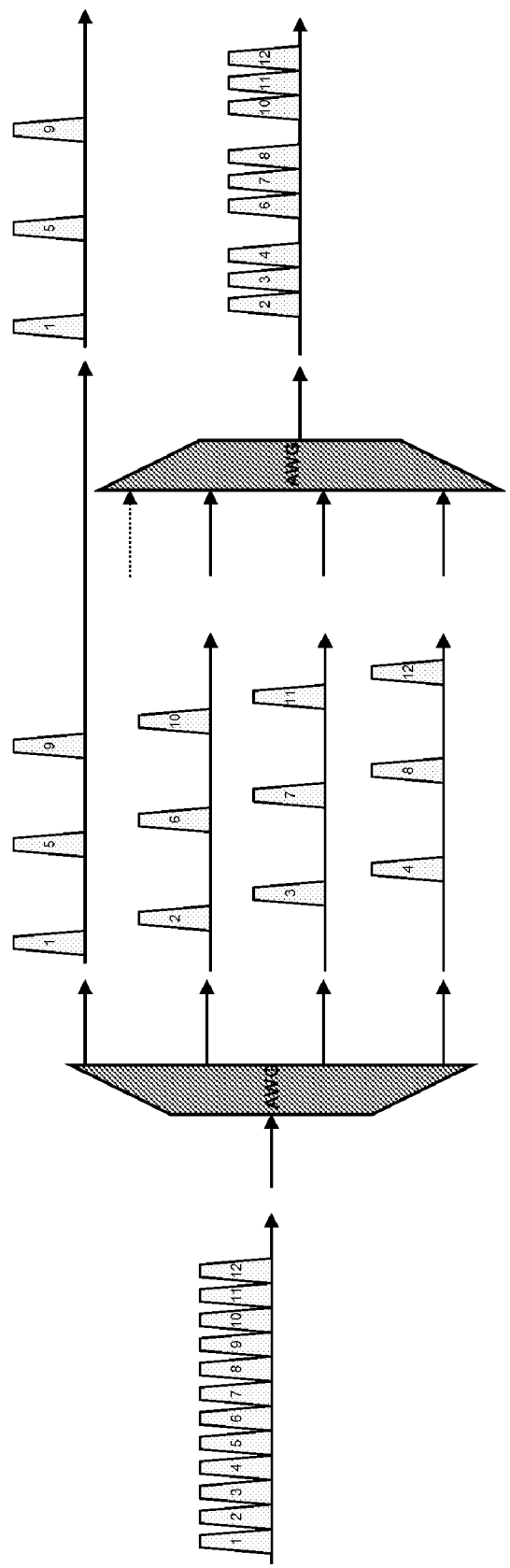
FIG. 5 is a schematic showing a fixed asymmetric interleaver constructed using arrayed waveguide grating (AWG) structures.

With reference to FIG. 5, there is shown a fixed asymmetric interleaver constructed with an AWG. When constructed in this manner, the resulting interleaver exhibits a fixed structure, having the same FSR in cascade while leaving some ports disconnected as illustrated in the figure.

According to one aspect of the present invention, an interleaver that offers both passband frequency shifting and asymmetric ratio adjusting capabilities is produced. As a result, such an interleaver is called a tunable asymmetric interleaver (TAI).

As will be shown, such a tunable asymmetric interleaver may be divided into 2 sub-types namely, a single edge tunable and a dual edge tunable adjustable interleaver. With the single edge TAI, one edge of each passband is fixed, therefore the center wavelength/frequency of the passband cannot be independently controlled. With a dual edge TAI; both edges of the passband can be tuned, allowing the center frequency of the Odd and Even passbands to be adjusted independently.

And while the single edge TAI only requires one tuning stage, the dual edge TAI contains two tuning stages, so it is capable of locking the center frequency of the outputs to the ITU-T grid. This is an essential characteristic for most DWDM applications. In addition, with a dual edge TAI, the Odd and Even outputs can be swapped. In the discussion that follows, the TAI refers to the dual edge TAI, unless otherwise specified.

Another type of non-conventional interleaver is the period tunable interleaver. Advantageously, the FSR of the period tunable interleaver output can be adjusted. Such adjustment may be achieved in a variety of ways such as varying the path lengths of the interferometer. Despite its adjustability, this type of interleaver is not very useful in a DWDM system as most DWDM networks follow ITU-T channel grid.

Function of Tunable Asymmetric Interleaver.

Figure 6:
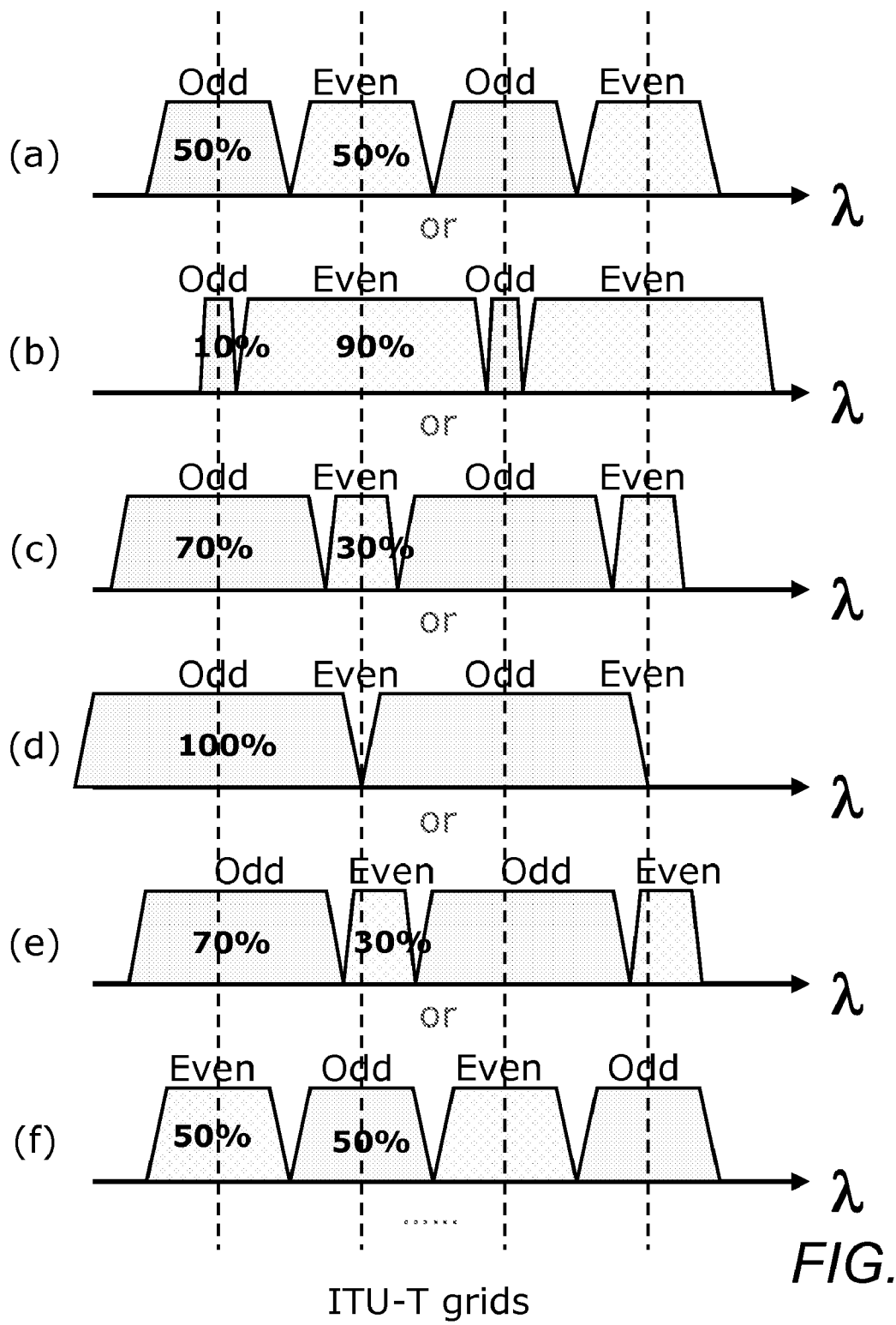
FIG. 6 is a series of diagrams showing the function of a tunable asymmetric interleaver according to the present invention.

Turning now to FIG. 6, there it shows various output capabilities of a dual edge TAI. Advantageously, it can function as a conventional interleaver exhibiting a symmetric 50:50 output ratio and wavelengths centered at ITU-T grid (FIG. 6(*a*)). Alternatively one can adjust the passband width ratio between 2 outputs (the interleaving ratio) while maintaining ITU-T grid-centered passbands (FIG. 6(*b*) and FIG. 6(*c*)); or the ratio can be set continuously from 50:50 to 0:100 (FIG. 6(*d*)). Additionally, it also allows non-ITU-T grid centered passbands (FIG. 6(*e*)), similar to tunable shift interleaver, while allowing asymmetric output ratio simultaneously. In that case where the wavelength shift reaches 50% of the FSR and the output passband ratio is 50:50; the outputs of the interleaver will be exactly opposite to a conventional interleaver (FIG. 6(*f*), c.f. FIG. 6(*a*)).

Function of Tunable Asymmetric Interleaver.

According to an aspect of the present invention, the TAI includes 2 symmetric interleavers in cascade. Of the two symmetric interleavers, one is a 1×2 tunable shift interleaver and the other is a 2×2 cyclic tunable shift interleaver. These 2 interleavers have the same FSR setting, and this FSR value is twice the FSR of the resultant TAI. For example, to construct a 1×2 50 G/100 G TAI (50 GHz FSR for the common input port, and 100 GHz FSR for the 2 interleaved output ports), the 2 tunable shift interleavers should be 100 G/200 G interleaver (100 GHz FSR for the input port(s), and 200 GHz FSR for the output ports).

Figure 7:
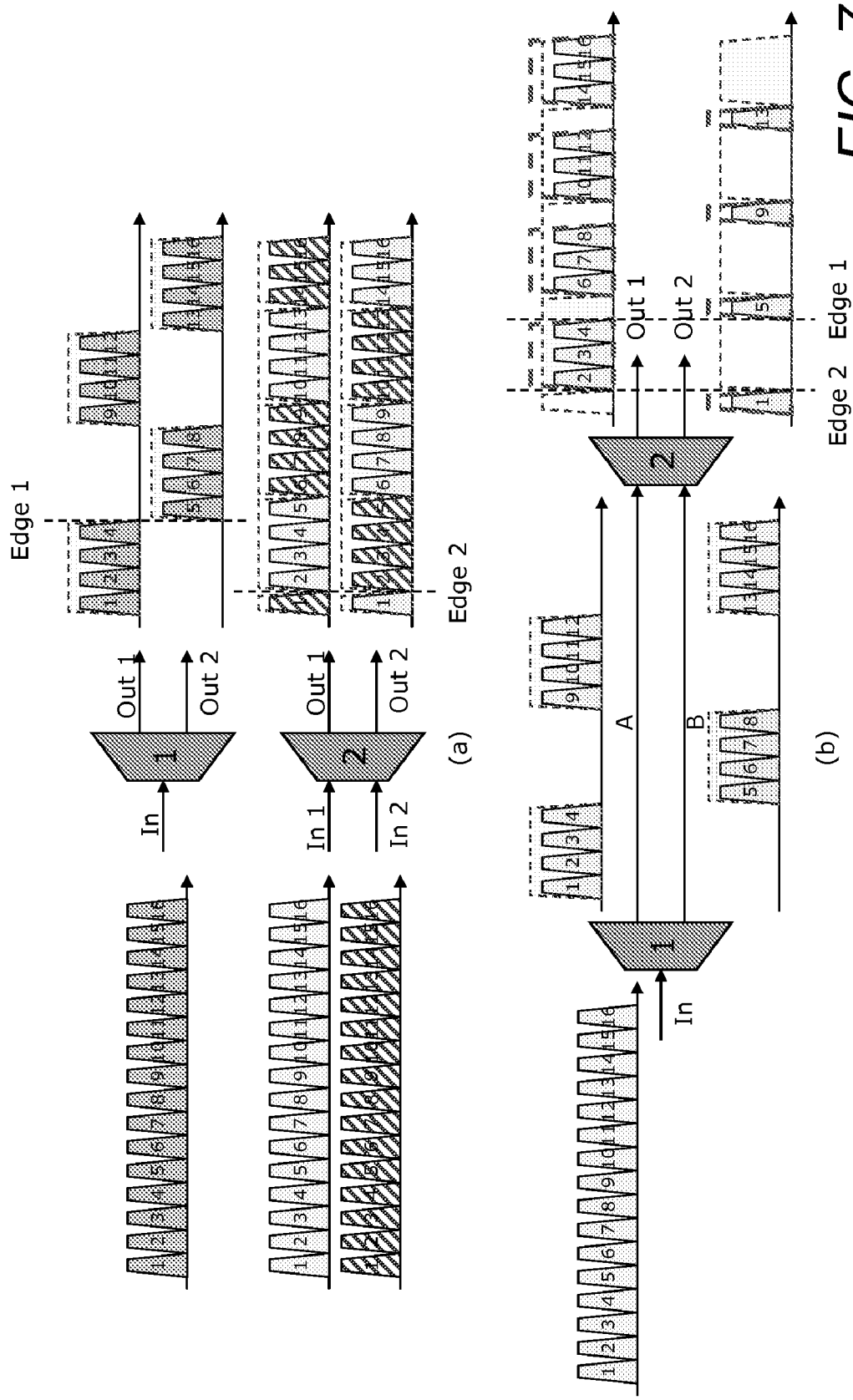
FIG. 7 is a schematic showing the design of an asymmetric interleaver having (a) two interleaver components and a (b) combined asymmetric interleaver.

FIG. 7 illustrates the design of a TAI using a fixed asymmetric interleaver based on the same structure. More particularly, FIG. 7(*a*) shows the functions of the 2 interleaver components having substantially the same FSR but a certain level of center wavelength offset (shift)—represented as Edge 1 and Edge 2 in the diagram. The dotted line regions are the passbands.

As shown in this FIG. 7(*a*), each passband contains 4 neighboring channels. The FSR values for the interleaver output ports are all equal to 8 times the input channel separation (or called channel spacing). Within the first 8 channels, Output 1 of the first interleaver has a passband containing Channels 1-4 of the input signal, while the passband of Output 2 contains Channel 5-8.

The output passbands of the second interleaver has a wavelength shift equal to the input channel separation. So the Output 1 contains Channel 2-5 of Input 1, while Output 2 contains Channel 1 and Channels 6-8. Since this is a 2×2 cyclic interleaver, Output 1 also contains the complementary channels from Input 2, namely Channel 1 and Channels 6-8. Similarly Output 2 contains Channels 2-5 of Input 2.

According to one aspect of the present invention, when these 2 symmetric interleavers are placed in cascade such as shown in FIG. 7(*b*)), the 2 outputs of the first interleaver become the inputs of the second interleaver (points A and B on the FIG. 7(*b*)). Due to the passband center wavelength offset between these 2 interleavers, Channel 2-4 from the Input reach Output 1 of the combined interleaver via point A.

Even though Channel 5 from point A can also reach Output 1, the signal at point A does not contain Channel 5; therefore only 3 channels reach Output 1 via A. Similarly, Channels 6-8 of the input signal reach Output 1 via point B. The complementary channels (Channel 1 and 5) end up at Output 2 via point A and B respectively. As a result, Output 1 contains Channels 2-4 and Channel 6-8, representing 75% of the first 8 input channels, while Output 2 contains 2 channels or 25%.

Due to periodic behavior of interleaver, this same ratio is obtained at any adjacent 8 channels and therefore throughout the overall spectrum. As a result, asymmetry at the interleaver output is thus achieved.

The separation between Edge 1 and Edge 2 in this FIG. 7(b) determines the asymmetry ratio. It should be noted that the 2 outputs has an FSR value equal to 4 times the input channel separation, as compared to the 8 times channel spacing FSR at the 2 interleaver components.

Figure 8:
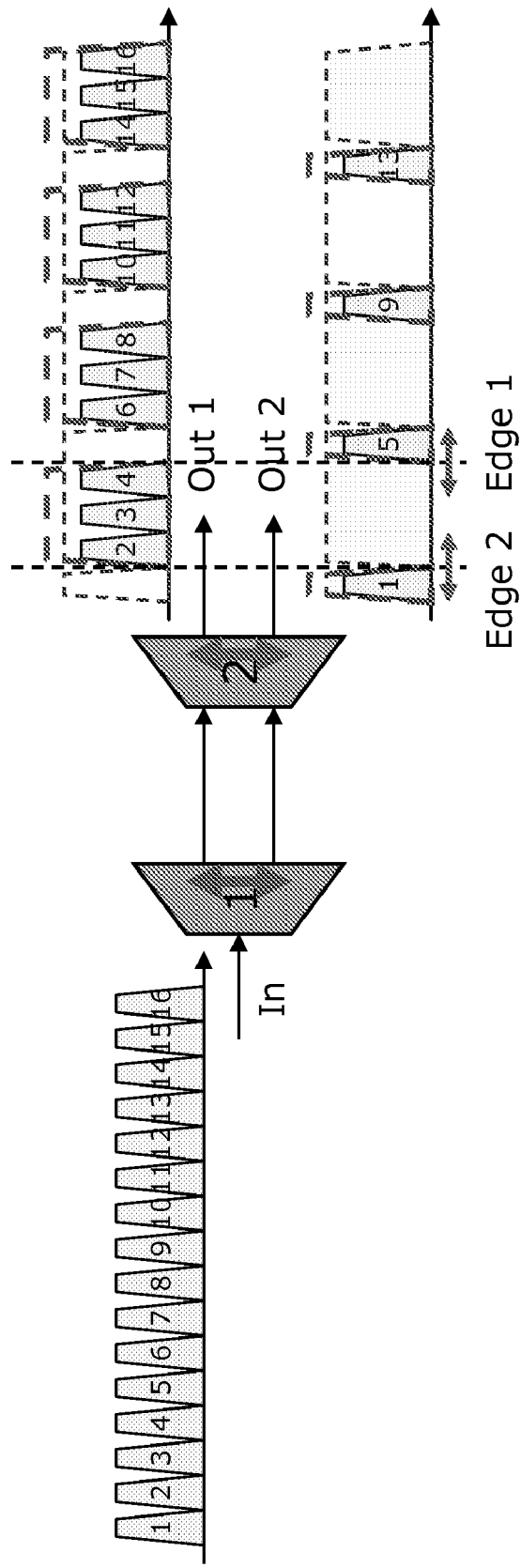
FIG. 8 is a schematic showing the design of an tunable asymmetric interleaver according to the present invention.

According to the present invention, these same principles can be applied in the tunable case. For example, if the first 1×2 symmetric interleaver becomes a tunable shift interleaver, the spectral position of Edge 1 can be tuned. Similarly, Edge 2 in the second interleaver (2×2 symmetric interleaver) can be varied if this second interleaver is a tunable shift interleaver. With different Edge 1 and Edge 2 values, different passband widths at the output ports can be obtained. Thus the asymmetry level (passband ratio) can be adjusted and the interleaver becomes a TAI such as that shown in FIG. 8.

As can be readily appreciated, if only one of the 2 interleaver components is tunable, only one edge can be tuned. Such a configuration corresponds to the single stage TAI described above and does not have full passband center wavelength tuning capability. With a dual stage TAI however; the center of the passband can be tuned to ITU-T grid by selecting equal distance from both edges to the ITU-T wavelength/frequency.

Implementation of Tunable Asymmetric Interleaver.

Advantageously, and according to the principles of the present invention, the working principle of the TAI shows that it is not limited to any particular type of implementation technology. More specifically, and according to the present invention, the only 2 requirements to construct a TAI are: tunability for wavelength shift and cyclic capability. Advantageously, both of these 2 requirements can be realized with many existing interleaver technologies.

As described previously, tunable shift interleaver can be constructed using birefringent elements with mechanical rotation control or by adjusting the resonator in the resonator-based interferometer structure such as varying G-T cavity length in MGT interferometer-based interleaver. As for the cyclic aspect, most of the 1×2 interleaver design structure can be extended to 2×2 structure due to the symmetrical property of the interleaver. Of course, the requirement for the alignment and calibration is stricter and therefore cyclic interleavers are slightly more difficult to manufacture in some technologies. For technologies such as PLC-based AWG, there is little extra difficulty to make cyclic interleaver.

Accordingly, and as can be appreciated by those skilled in the art, a TAI constructed according to the principles of the present invention may be implemented utilizing any of a number of technologies including all-fiber M-Z linear interferometer; FBG-based coupled resonator; and free-space MGT interferometer technologies. Appropriate tuning mechanisms, such as thermal variation, mechanical rotation, and acousto-optic modulation, can be used for a number of these different technologies. Significantly, and according to the present invention, the 2 interleaver components used in the TAI can be constructed using different technologies.

Figure 9:
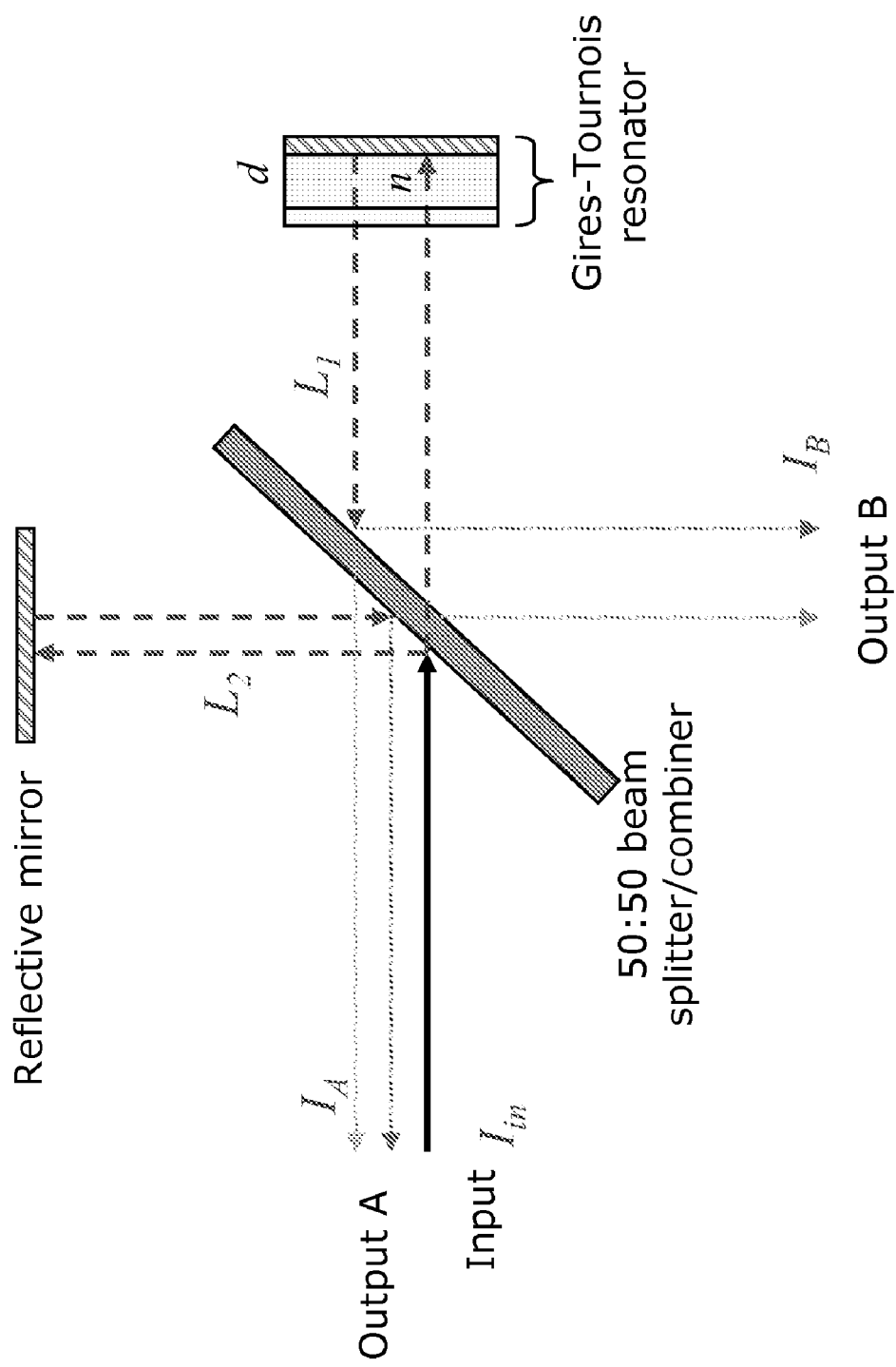
FIG. 9 is a schematic of a Michelson-Gires-Tournois interferometer employing a 1×2 interleaver.

In constructing prototypes of interleaves according to the present invention, MGT interferometer technology is used because it exhibits good optical performance with relatively simple configurations. Such a prototype configuration includes a Michelson interferometer with a 50:50 beam splitter/combiner and 2 arms. One of the arms includes a reflective mirror, and the other one has a Gires-Tournois (G-T) resonator (or called G-T etalon). A schematic diagram of this configuration is shown in FIG. 9.

Theoretical principles useful for a complete understanding of Michelson interferometer and G-T resonator—as necessary for a complete understanding of the present invention—are briefly described in Appendices A and B respectively.

Returning our attention to FIG. 9, at output A, 2 beams traveling along the 2 paths of the interferometer interfere thereby forming the interleaver output. The phase variation between these 2 paths $\Delta\phi_A$ comes from both Michelson interferometer and the G-T resonator. It is determined by the path length difference:

$$\Delta\phi_A = \Delta\phi_{A-Michelson} + \Delta\phi_{A-GT} = 2\pi\frac{f}{c}2(L_1 - L_2) + 2\pi\frac{f}{f_0}$$

where $L_1$ is the separation between the beam splitter and the reflective mirror, while $L_2$ is the separation between the beam splitter and the G-T resonator. $f_0$ is the FSR of the G-T resonator (50 GHz, 100 GHz, etc.). If we calibrate the lengths $L_1$ and $L_2$ to match $f_0$:

$$L_1 - L_2 = \frac{c}{4f_0}$$

then we have:

$$\Delta\phi_A = 2\pi\frac{f}{c}2\left(-\frac{c}{4f_0}\right) + 2\pi\frac{f}{f_0} = \pi\frac{f}{f_0}$$

Consequently, when $f=2m\cdot f_0$ where m is an integer, we have $\Delta\phi_A=0$, and $\Delta\phi_B=\pi$; and when $f=(2m+1)\cdot f_0$, we have $\Delta\phi_A=\pi$, and $\Delta\phi_B=0$; since $\Delta\phi_A$ and $\Delta\phi_B$ are odd number of $\pi$ out of phase in a Michelson interferometer.

Figure 10:
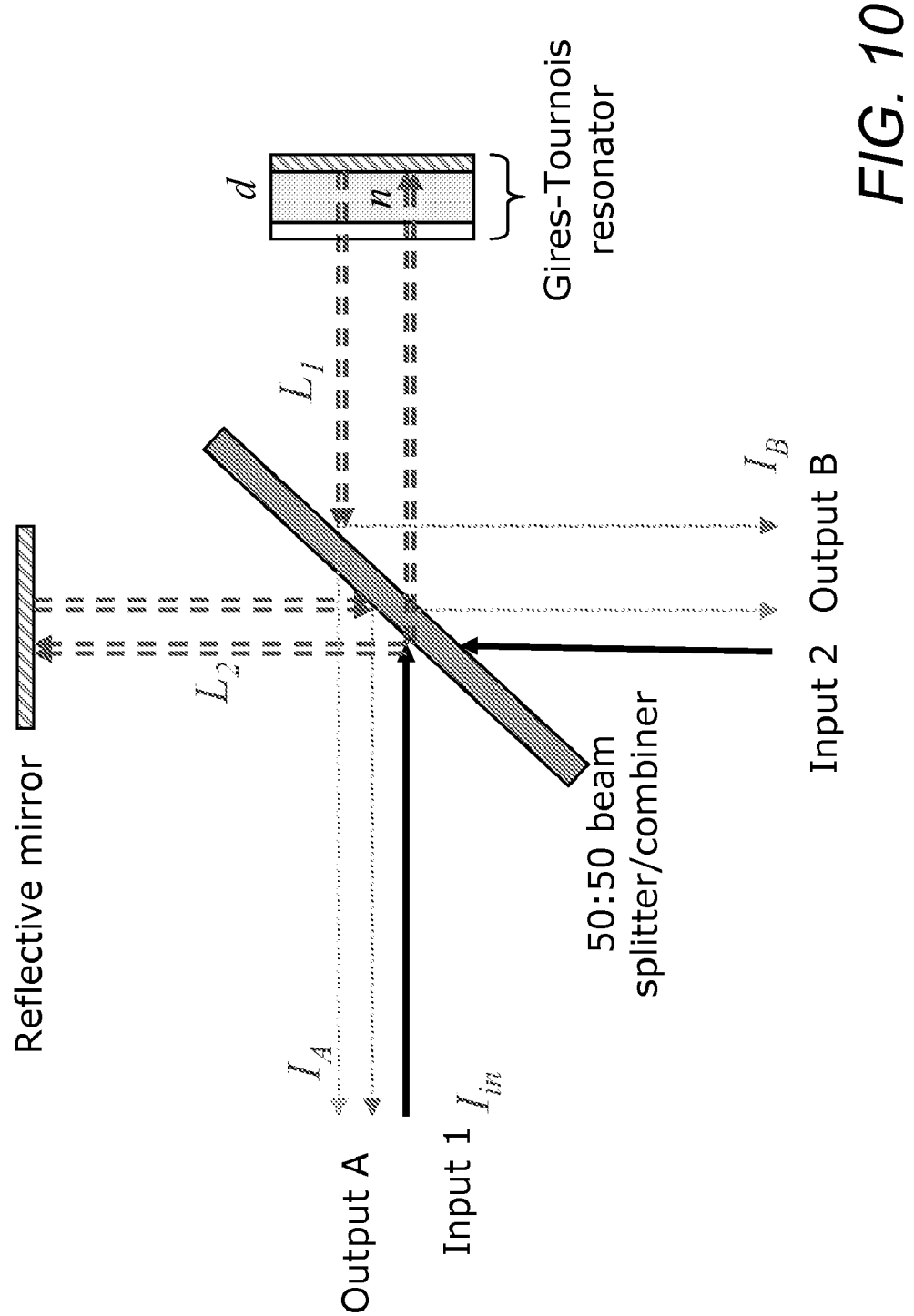
FIG. 10 is a schematic of a Michelson-Gires-Tournois interferometer employing a 2×2 cyclic interleaver.

Turning now to FIG. 10, there it can be seen that a 2×2 cyclic interleaver can also be constructed with a similar structure to that shown in FIG. 9. In this configuration shown in FIG. 10, the second input is placed perpendicular to the first input.

With some tuning mechanism, the lengths $L_1$ and/or $L_2$ can be adjusted, so the 0's and $\pi$'s can be obtained at different frequencies. So we will have $\Delta\phi_A=0$ and $\Delta\phi_B=\pi$ when $f=2m\cdot f_0+\Delta f$, and $\Delta\phi_A=\pi$ and $\Delta\phi_B=0$ when $f=(2m+1)\cdot f_0+\Delta f$.

If the reflective mirror in FIG. 10 is replaced by another G-T resonator, the output passband profile can be further improves with better square-like behavior and superior channel isolation. Advantageously, this G-T resonator which replaces the reflective mirror does not need to be tunable.

To further improve the passband profile, one of the single cavity G-T resonators may be replaced by a multi-cavity G-T resonator, however the chromatic dispersion of the interleaver worsen significantly. Another alternative design is to replace both single cavity G-T resonators with multi-cavity ones. This configuration produces very good CD result with the trade-off of narrower passbands.

It should be noted that a polarized version of MGT interferometer is not suitable for constructing tunable shift interferometer. This is due to the fact that with a polarized MGT structure, the 2 polarization states function as the 2 beams in the interferometer. A result is that these 2 interfering beams propagate on the same paths and do not exhibit a path length difference relative to one another. While this is a desirable property for a conventional interleaver due to its high tolerance and ruggedness, however a polarized MGT structure is not suitable for TAI implementation since the path length difference is necessary to achieve a wavelength shift.

Among various tuning technologies available, thermal tuning was used in our prototype and provided satisfactory results. This is due, in part, to the fact that thermal tuning does not require any moving parts such as stepper motor used in mechanical tuning, and thermal controller with fine adjustment capability is widely available.

One disadvantage of thermal tuning however is the tuning speed. However since the thermal mass of the GT cavity is low due to the small physical size, fast (sub second level) tuning can be achieved using Peltier type temperature controller (also called thermal-electrical cooler or TEC, although it can also be used for heating). Advantageously however, this tuning speed is sufficient for applications in DWDM networks, since interleaver tuning and reconfiguration is only required occasionally, unlike optical circuit provisioning or optical burst switching.

Performances of Tunable Asymmetric Interleaver: Experiment and Analysis

In constructing a representative tunable asymmetric interleaver according to one aspect of the present invention, the 2 interleaver components are not necessarily integrated into a single physical enclosure. In addition, the first stage 1×2 symmetric interleaver exhibits a wavelength shift through the effect of thermal tuning, and the second stage 2×2 cyclic interleaver has fixed symmetric outputs. These 2 symmetric interleavers are connected using FC/PC connectors.

Figure 11:
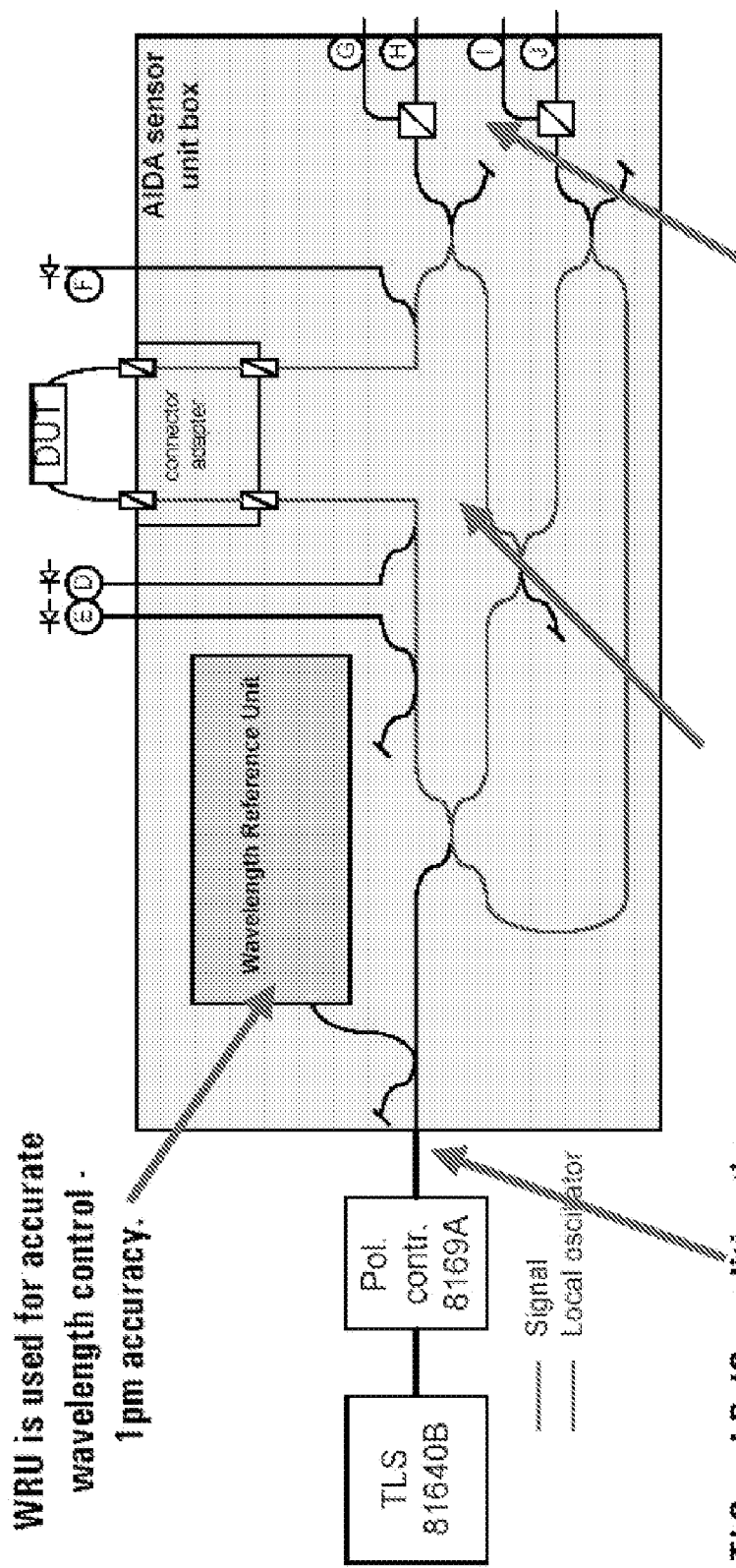
FIG. 11 is a schematic of an Agilent 81910A photonics all-parameter analyzer employed to characterize prototypes constructed according to the present invention.

Optical performance measurement was performed using an Agilent Photonics All-parameter Analyzer 81910A. The analyzer consists of an Agilent 81640B low SSE tunable laser that sweeps across the whole C-band spectrum, an Agilent 8169A polarization controller to set various polarization states for the input laser beam, 3 Agilent 81634B high power range optical power sensors to detect optical power levels at different measurement points, an optical test head with built-in interferometers, wavelength reference unit and stability setting stage, and a controller PC with high-speed sampling PCI cards and analysis software (Agilent Photonics Analysis Toolbox version 2.70). The schematic of the 81910A analyzer is shown on FIG. 11.

Interleaver Output Profiles.

Figure 12:
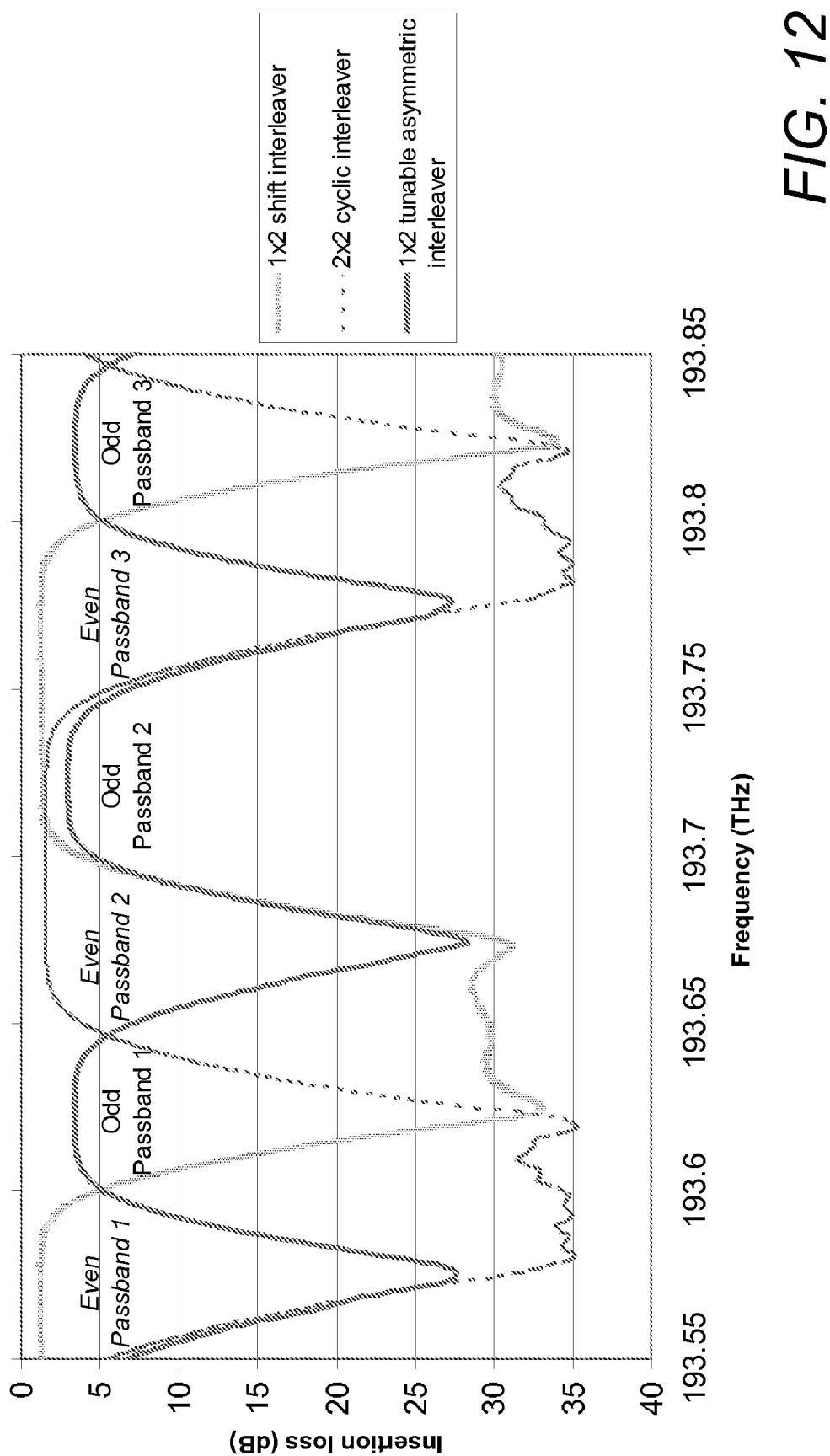
FIG. 12 is a spectral graph of individual interleaver components and combined tunable asymmetric interleavers at room temperature.

FIG. 12 shows a portion of an output spectra of the individual and combined interleavers at operating at room temperature. The shaded curve is the spectrum of one of the outputs of the 1×2 shift interleaver when the temperature controller is set to room temperature. The dotted curve is the spectrum at one of the outputs of the 2×2 symmetric cyclic interleaver measured individually.

The solid curve is the resulting output spectrum when these 2 individual symmetric interleavers are connected together in series. It can be observed that the resultant TAI has a FSR equal to half of the FSR of the 2 interleaver components. Half of the TAI passbands (such as Odd Passband 2 on FIG. 12) each contains one edge of the 1×2 shift interleaver (the rising edge under the frequency spectrum) and one edge of the 2×2 cyclic interleaver (the falling edge under the frequency spectrum). The other half (such as Odd Passbands 1 and 3 on FIG. 12) each has the rising edge from the other output of the 1×2 shift interleaver and the falling edge from the other output of the 2×2 cyclic interleaver (not shown here).

Figure 13:
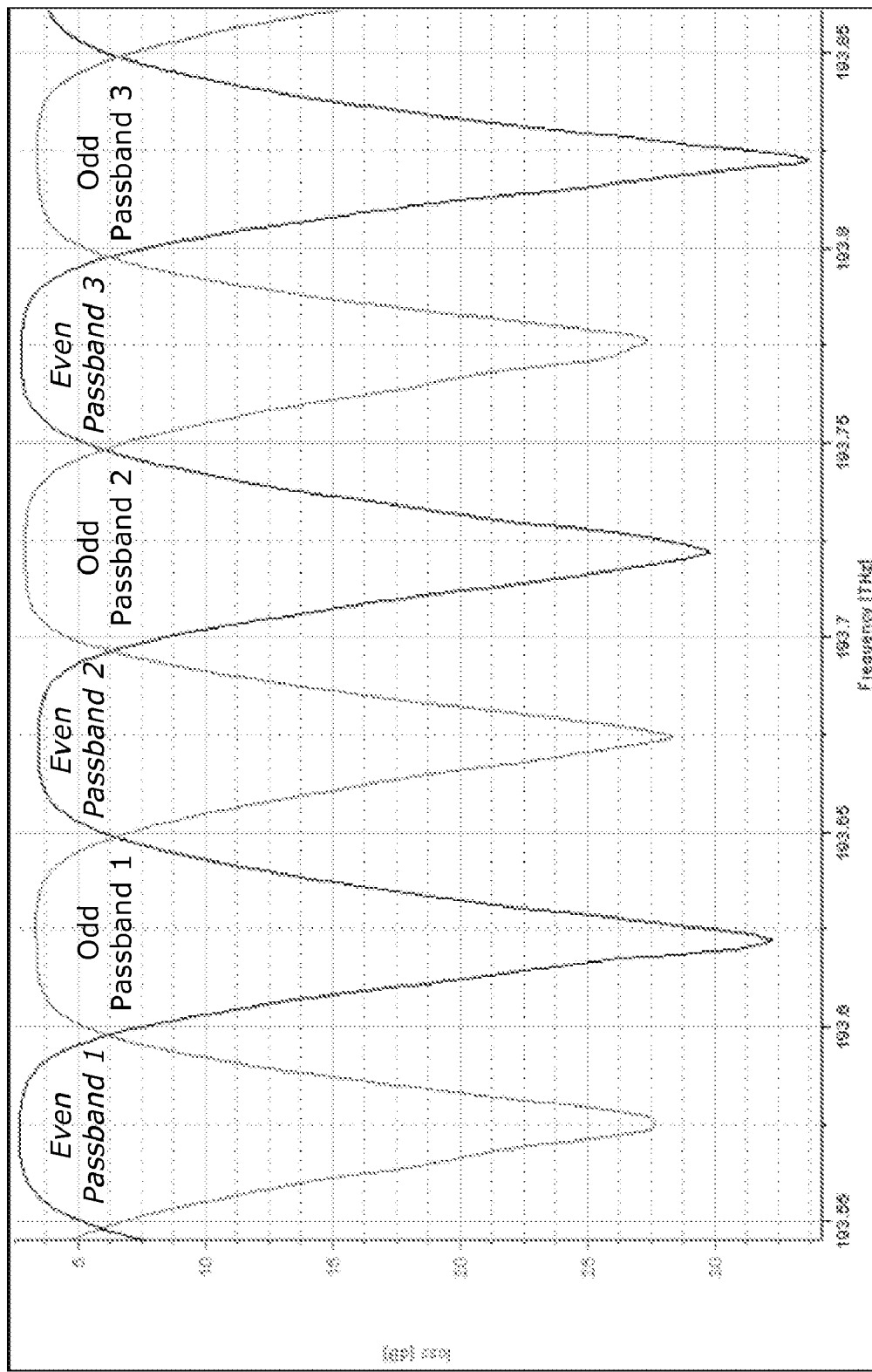
FIG. 13 is a spectral graph of tunable asymmetric interleaver outputs at room temperature.

It is vice versa for the Even Passbands contained at the other output of the TAI interleaver. The spectral locations of these passbands are marked by Even Passbands 1-3 on FIG. 12. FIG. 13 shows the Odd and Even outputs of the TAI at room temperature on the same spectrum. It shows that the Odd and Even passband ratio at room temperature is about 50:50.

Since the passbands of the combined TAI is constructed by the intersected spectral area of 2 interleaver components, the slopes of the passband edges are the same as the slopes of the individual interleavers. As described above, the individual interleavers are originally designed to interleave signals with periods equal to twice the SFR of the TAI. So the passband edge slope is only optimized for larger FSR and larger spectral separation between the WDM signals. With half the FSR, the requirement for steepness of the passband edge and width of passband is higher. Therefore TAI constructed with interleavers exhibiting standard square-like profiles will have worse square-like profile compared to the single stage interleaver.

Figure 14:
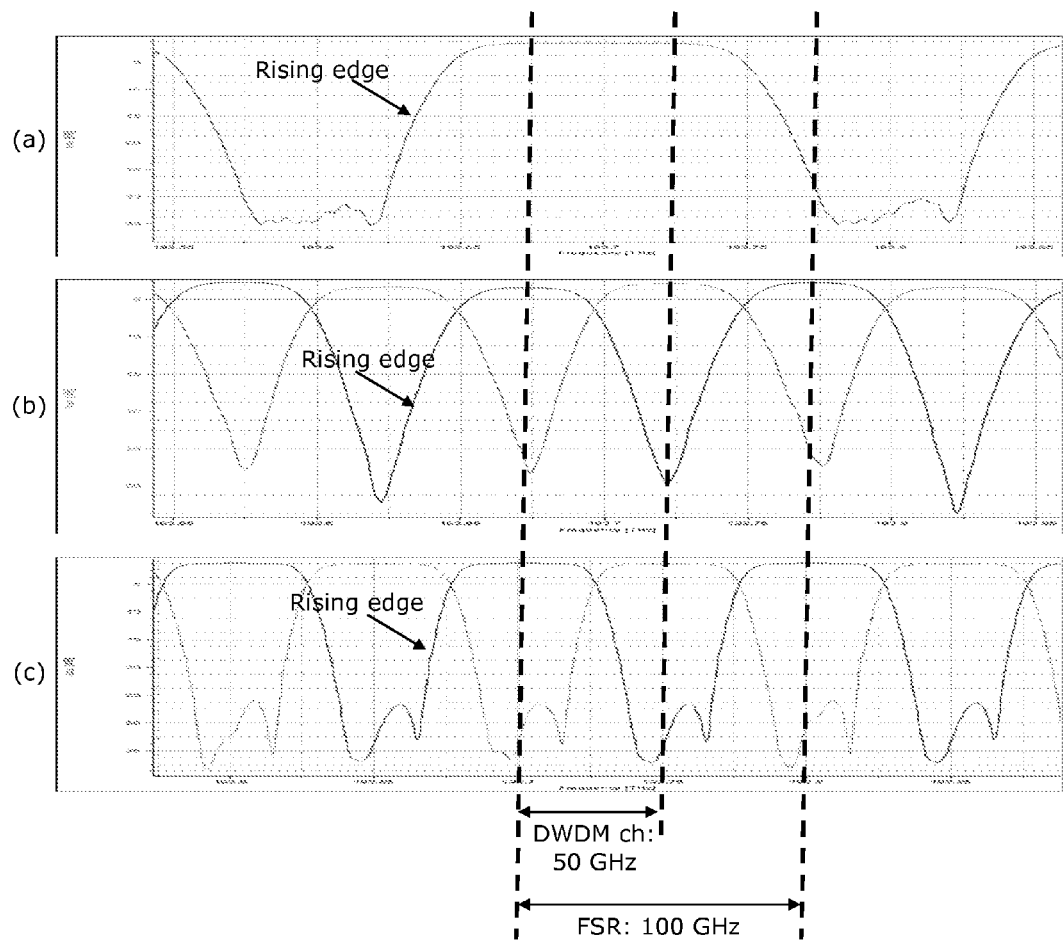
FIG. 14 is a series of graphs showing passband edge comparisons for (a) interleaver components; (b) combined tunable asymmetric interleaver; and (c) standard interleaver.

FIG. 14 is an example of such a configuration. With reference to that FIG. 14, there it shows in FIG. 14(*a*) the output of one of the interleaver components that make up the TAI. This interleaver output has a FSR of 200 GHz. Its rising edge slope is suitable for 200 GHz FSR applications that separates the odd and even channels of DWDM signals with 100 GHz spacing.

This rising edge forms the rising edge of the TAI's output passband (FIG. 14(*b*)). Despite the fact that the resultant TAI has a FSR of 100 GHz and can separate DWDM signals with 50 GHz spacing, the steepness of its rising and falling edge does not reach the steepness level of a single stage interleaver with the same 100 GHz FSR (FIG. 14(*c*)). This will lead to more crosstalk from the neighboring channels and narrower useable passband.

This problem was observed with an engineering prototype used in our experimental evaluations—since it is constructed using standard symmetric interleaver components. The maximum crosstalk level of the passband is 25 to 34 dB at the center of the passband (ITU-T grid frequency), a level sufficient for most applications, however it gets worse towards as the defined clear channel passband widens.

To solve this problem, stricter passband profiles are required for the two interleaver components. For a 50 G/100 G interleaver (interleaver with 100 GHz FSR at the output to separate DWDM signals with 50 GHz channel spacing), the two 100 G/200 G interleaver components should be designed to meet the slope requirement of standard 50 G/100 G interleaver. As described above, there are various techniques to improve the passband profile to be more square-like, including replacing a single cavity G-T resonator with a multi-cavity resonator.

Optical Characteristic Test.

The peak insertion loss figures of the passbands are about 1.25 to 1.5 dB for the 2 interleaver components respectively. The combined TAI has peak insertion loss of about 3 dB, including the connectors at both ends and between 2 interleaver stages. This figure is sufficiently low for most of the applications envisioned. In a production run, these 2 interleaver components may be integrated inside a single package and therefore require no fiber connectors or adapters there between. As can be readily appreciated by those skilled in the art, such a configuration can reduce the insertion loss further. Accordingly, 1.5 dB maximum insertion loss for the TAI without connectors is easily achieved.

Figure 15:
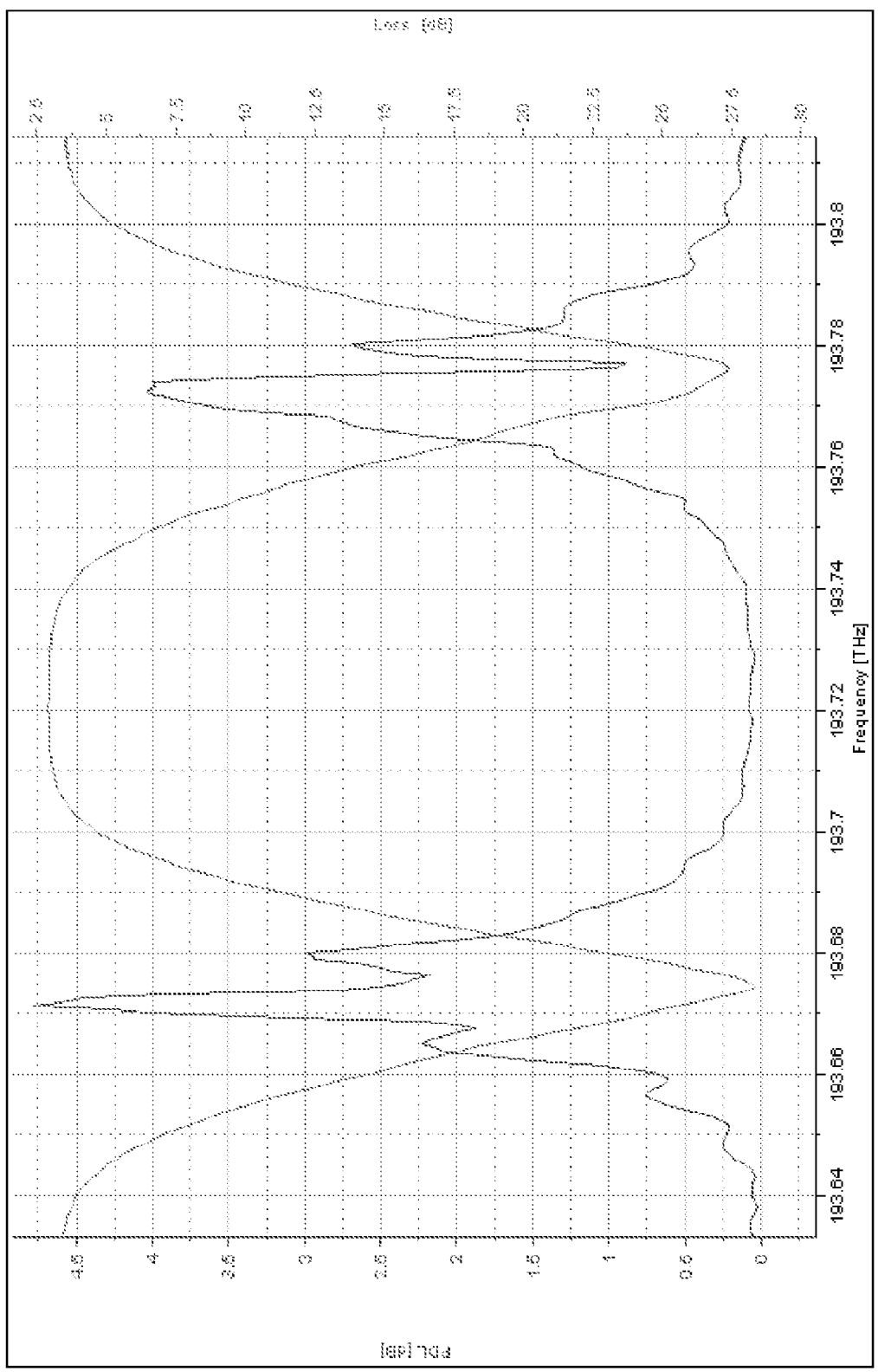
FIG. 15 is a graph showing polarization dependent loss of a tunable asymmetric interleaver (TAI)

FIG. 15 shows the polarization dependent loss (PDL) profile of one passband of the TAI with respect to the passband. Less than 0.13 dB PDL is observed at a 36 GHz passband for this channel at room temperature (about 50:50 splitting ratio for the passband with 100 GHz FSR). Similar results are obtained from other channels. This FIG. 15 shows that this TAI has good PDL performance.

Figure 16:
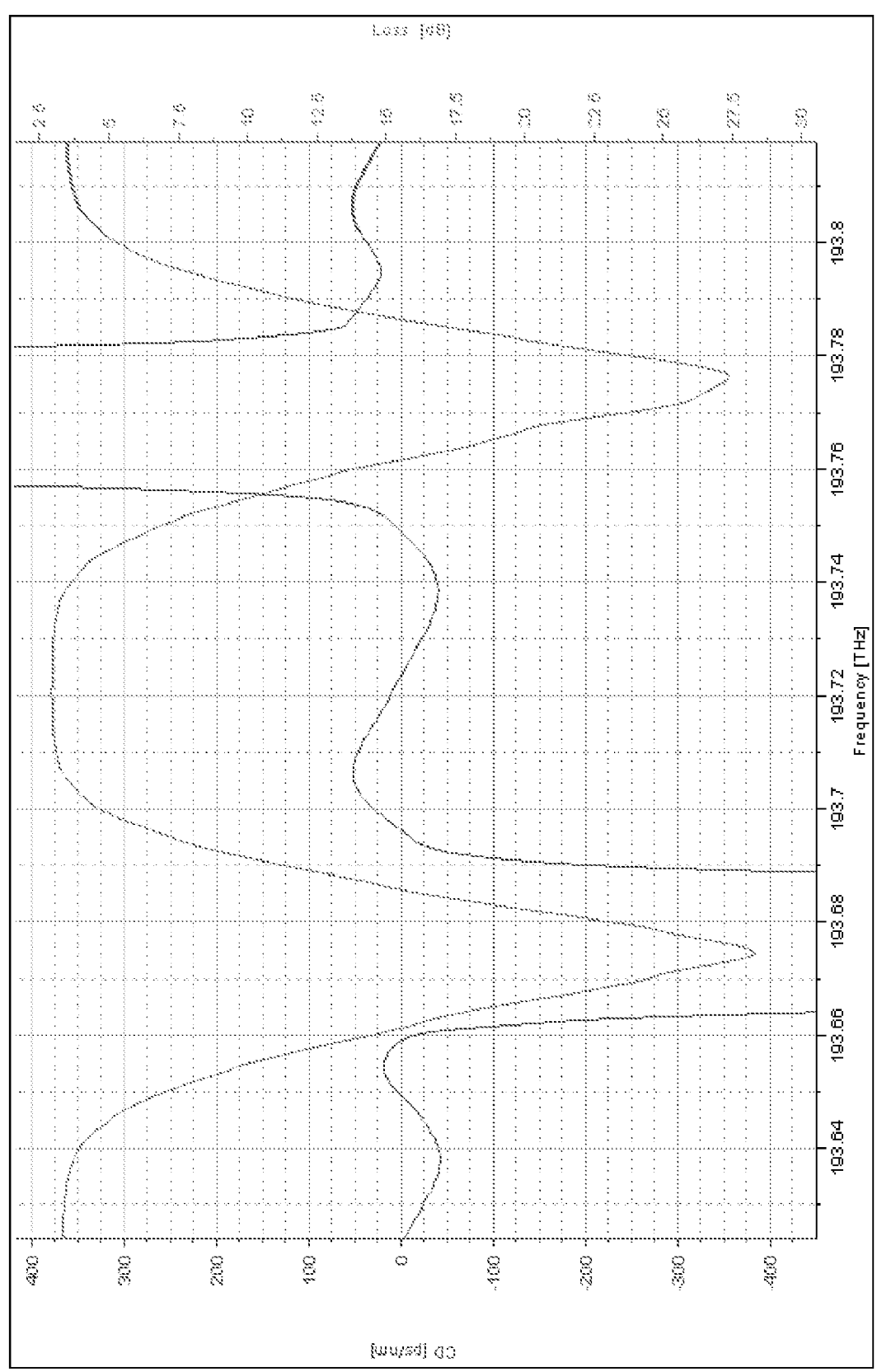
FIG. 16 is a graph showing chromatic dispersion of a TAI.

FIG. 16 is the chromatic dispersion (CD) profile of the same selected channel at room temperature. 50 pm resolution bandwidth is used for the calculation. The phase measurement data are averaged from 30 scans to reduce noise. Within a 20 GHz passband, the CD value is between ±33 ps/nm. For wider passbands (40 GHz or more), the CD figure ranges from −40 ps/nm to +50 ps/nm. These CD figures are relatively large. This is expected due to the resonance-based interleaver design. To reduce CD, non-resonance-based interleaver (such as the cascaded M-Z interferometer type) or dual multi-cavity G-T resonator interleaver can be used. However the latter design has trade-off in terms of the passband profile.

Figure 17:
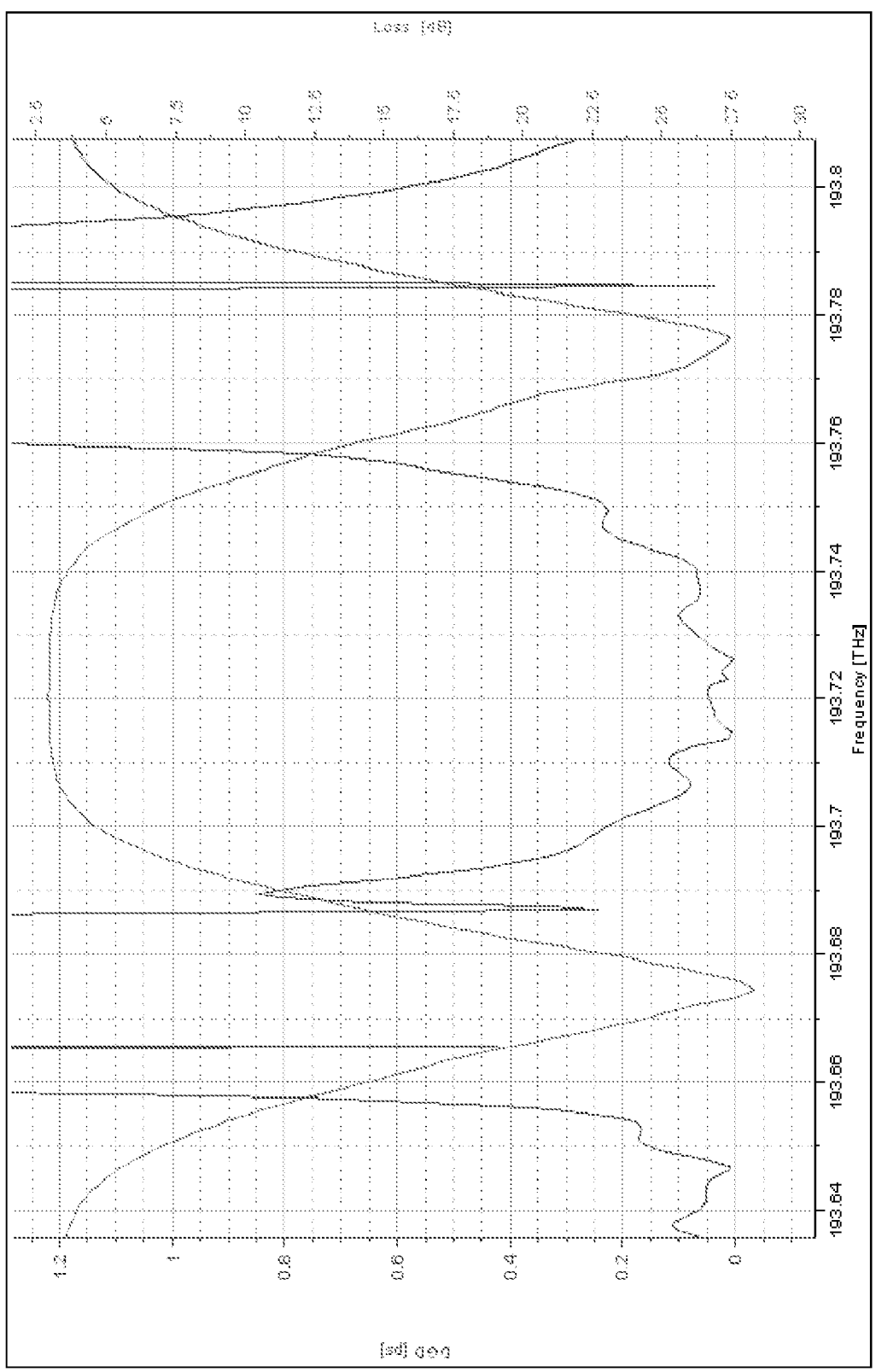
FIG. 17 is a graph showing differential group delay of a TAI.

FIG. 17 shows measured differential group delay (DGD) profiles for the same channel. The peak DGD within a 25 GHz passband is 0.11 ps, and the polarization mode dispersion (defined as the averaged DGD value within the passband) is less than 0.05 ps. These figures again show that the TAI prototype has good polarization related performance.

Asymmetry Tuning Test.

The tunable shift interleaver employed in the TAI experimental unit uses thermal tuning with Peltier type heater/cooler, and a thermal coupler is used to provide temperature reading. Because there is no temperature controlling equipment available that can take the thermal coupler readings, a temperature controller feedback circuit is set up to perform thermal tuning for the TAI as shown in FIG. 18.

Figure 18:
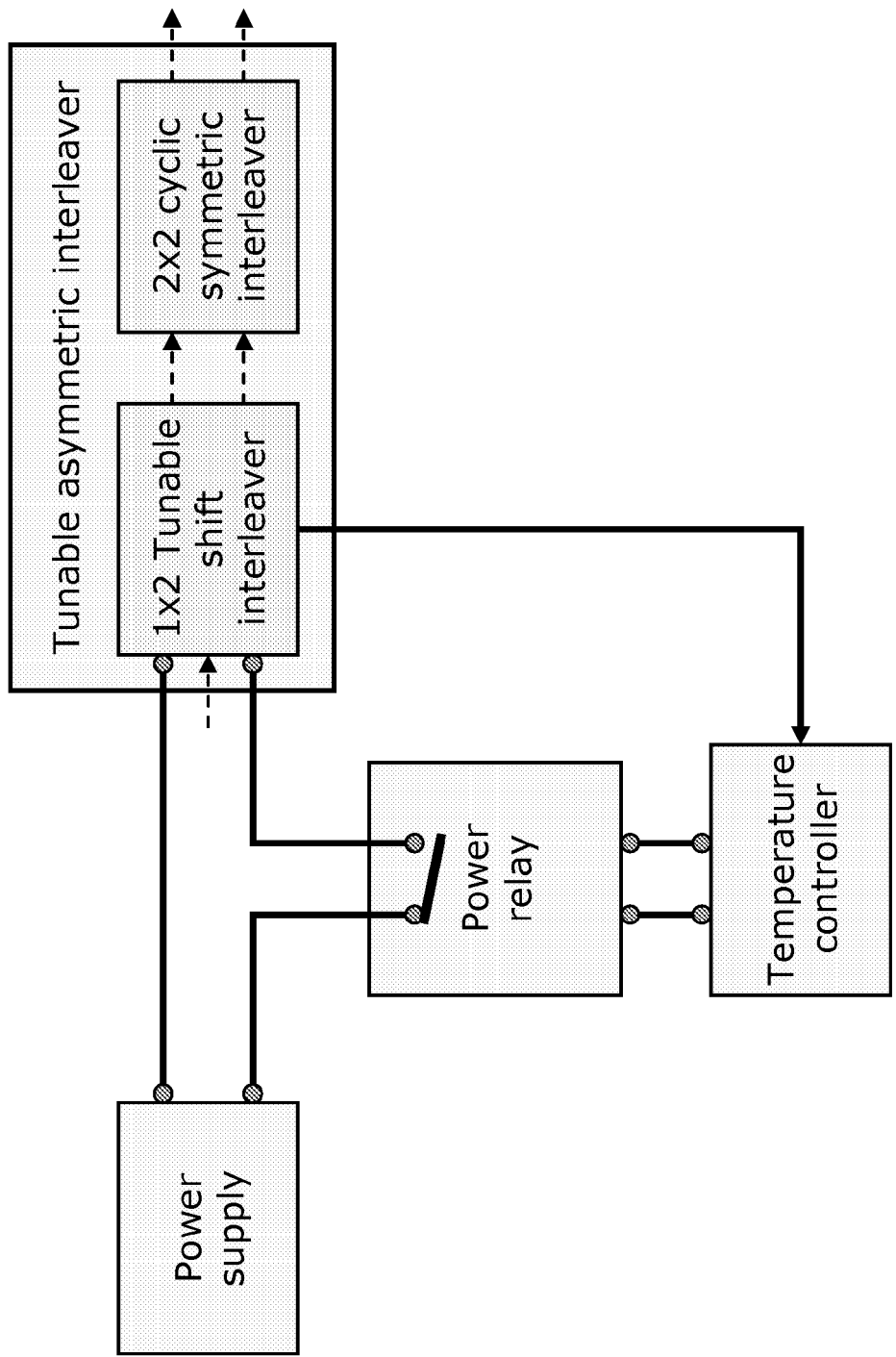
FIG. 18 is a block diagram showing a temperature control feedback circuit according to an aspect of the present invention.

With reference now to that FIG. 18, it may be observed that the feedback circuit includes a thermal coupler probe, a temperature controller capable of reading thermal coupler input, a power relay and a power supply.

Based upon a reading obtained from the thermal coupler probe, the temperature controller decides whether to close the circuit and supply power to the device. If the temperature controller circuit is closed, the power relay will close the power supply circuit which then provides up to 5 V voltage to either heat up or cool down the tunable shift interleaver through the Peltier thermoelectric device.

Subsequent TAI units may advantageously employ one or more thermistors to take temperature readings. Compared to thermal couplers in which the temperature reading is displayed as an electrical current, thermistors have a positive or negative resistance/temperature coefficient and therefore are thermally sensitive resistors. Advantageously for the purposes of the present invention, thermistors are less expensive and a greater variety of temperature controllers providing thermistor inputs are available. Another advantage is that when a thermistor is employed, a single circuit can perform both heating and cooling functions.

Figure 19:
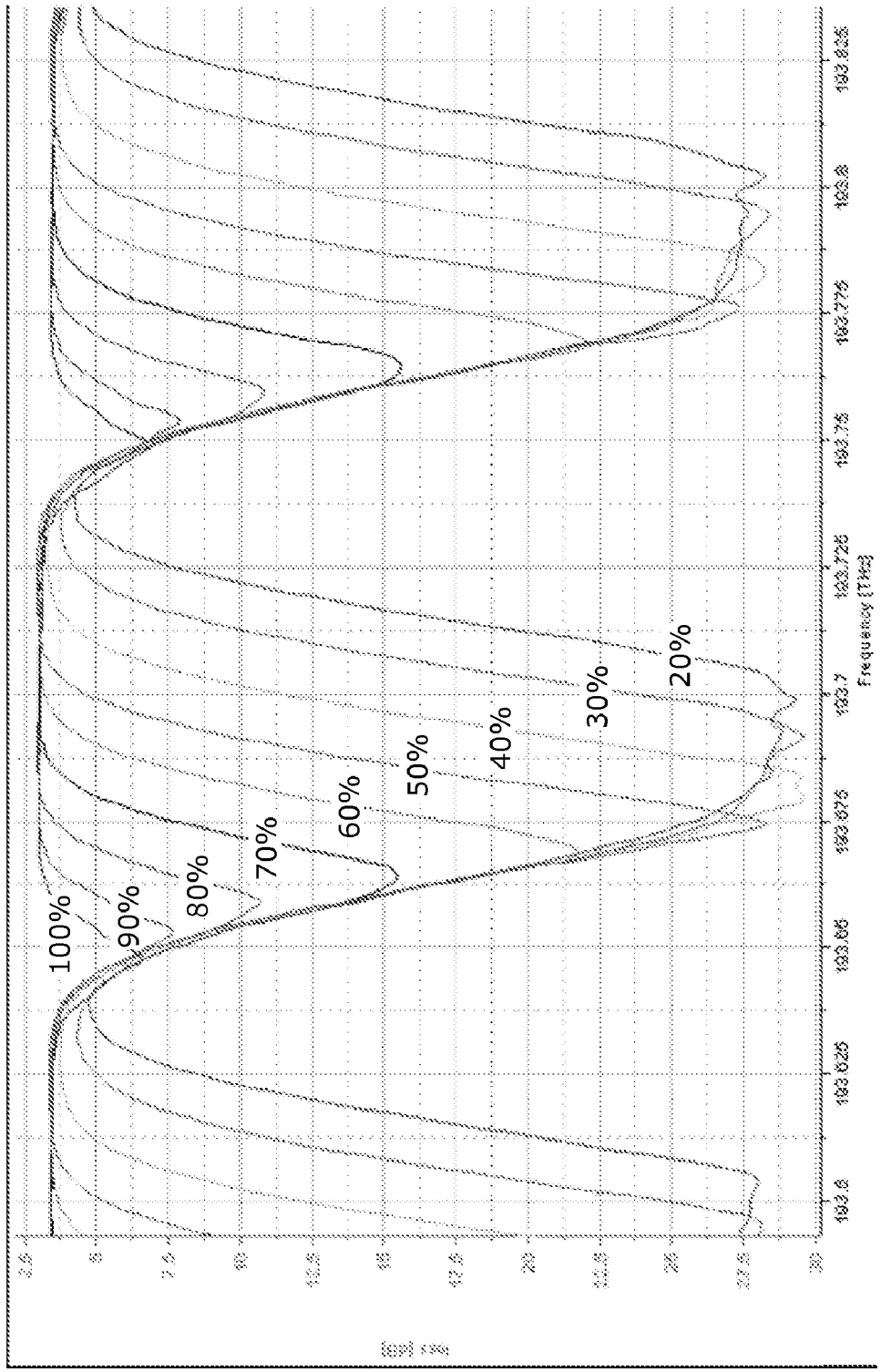
FIG. 19 is a graph showing passband profile at one TAI output port with interleaving ratio variations from 20% to 100%.

Temperature of the tunable shift interleaver is tuned from 7° C. to 75° C. As expected, the Odd:Even passband splitter ratio at the TAI output varies accordingly. FIG. 19 shows the passband profiles of one output of the TAI wherein the interleaving ratio varies from 20% to 100% of the FSR in steps of 10%. These passbands have the same falling edge because the falling edge is determined by the second interleaver component, namely the 2×2 cyclic interleaver. In the prototype this cyclic interleaver is not shiftable, therefore the passband cannot be centered at a same frequency such as the ITU-T grid.

Figure 20:
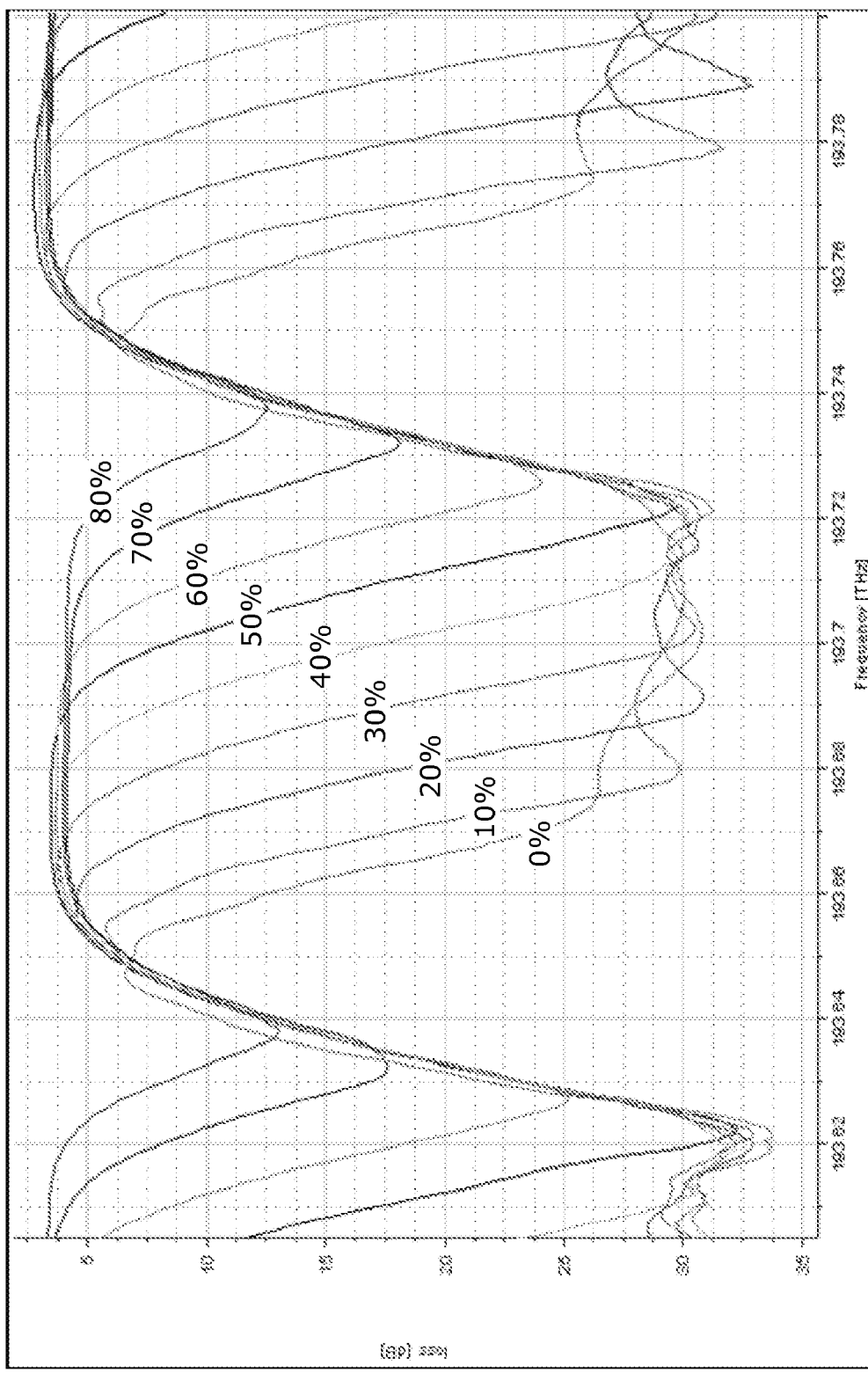
FIG. 20 is a graph showing passband profile at a second TAI output port with interleaving ratio variations from 80% to 0%.
Figure 21:
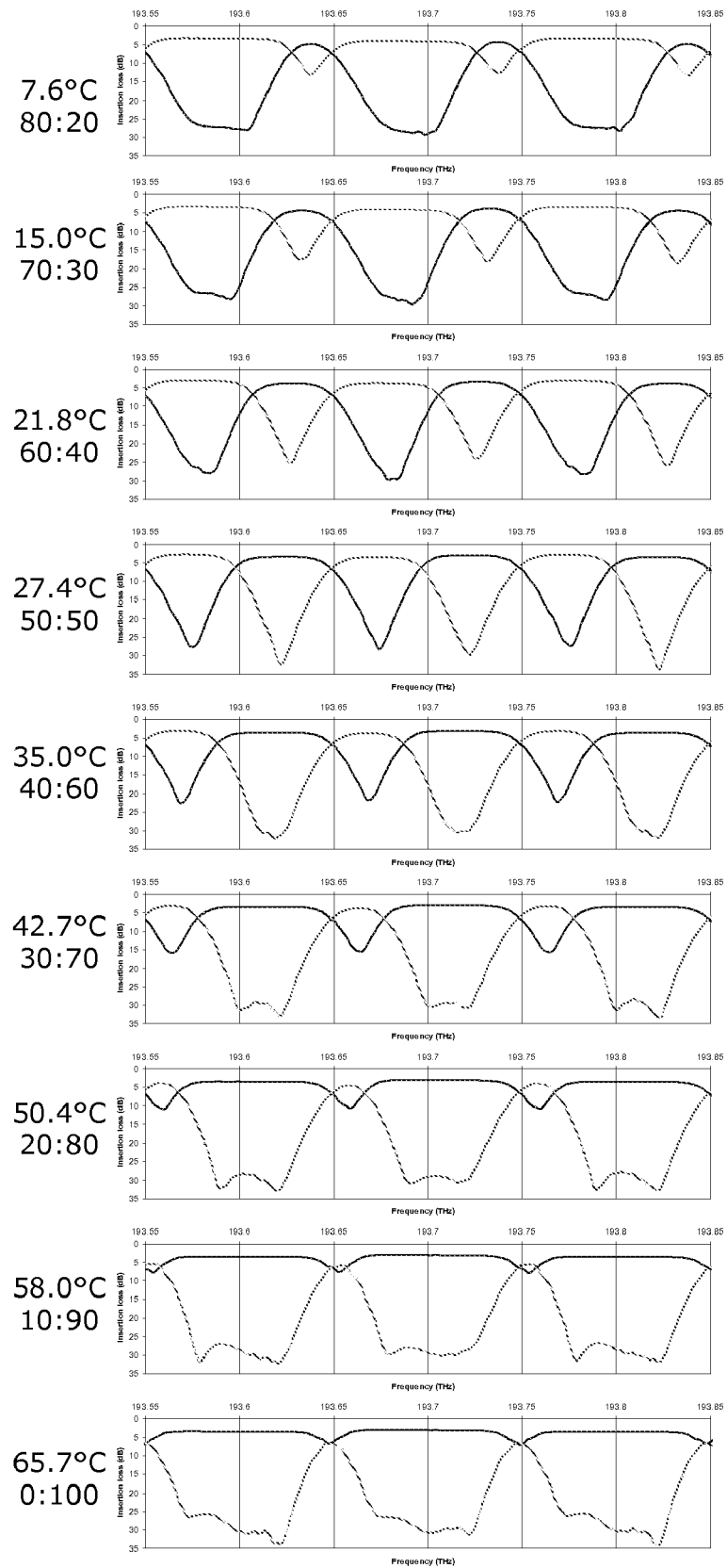
FIG. 21 is a series of graphs showing asymmetry tuning at different temperatures.

FIG. 20 shows the passband profiles for the second TAI output port output. The passband width varies from 80% to 0% of the FSR, complementing the passband width of the first output. The Odd and Even passbands at each temperature are plotted together in FIG. 21. Flat-top profiles are observed at wider passbands. There is no significant insertion loss variation relating to the asymmetry ratio.

Figure 22:
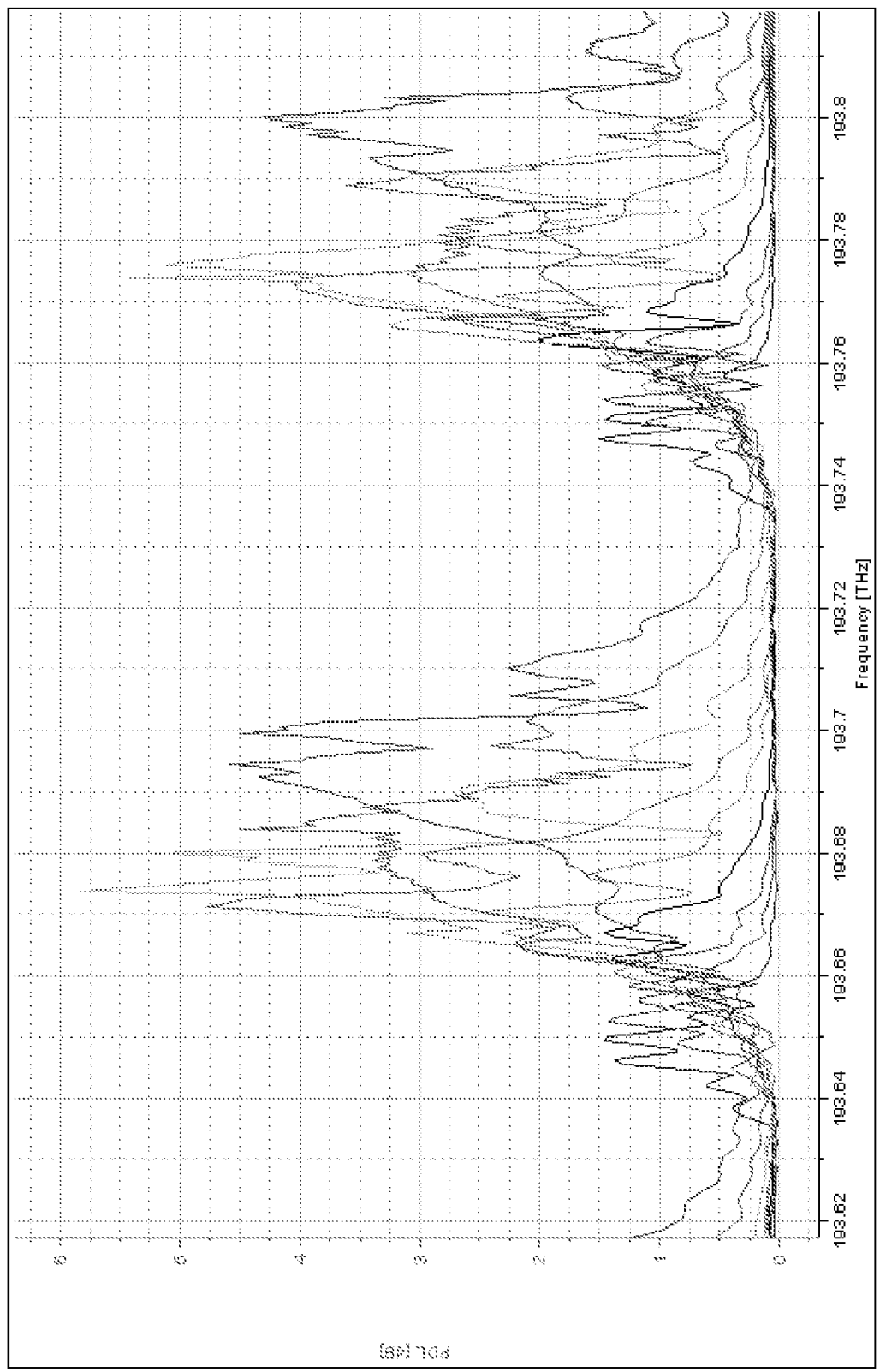
FIG. 22 is a graph showing polarization dependent loss variation at different interleaving ratios.
Figure 23:
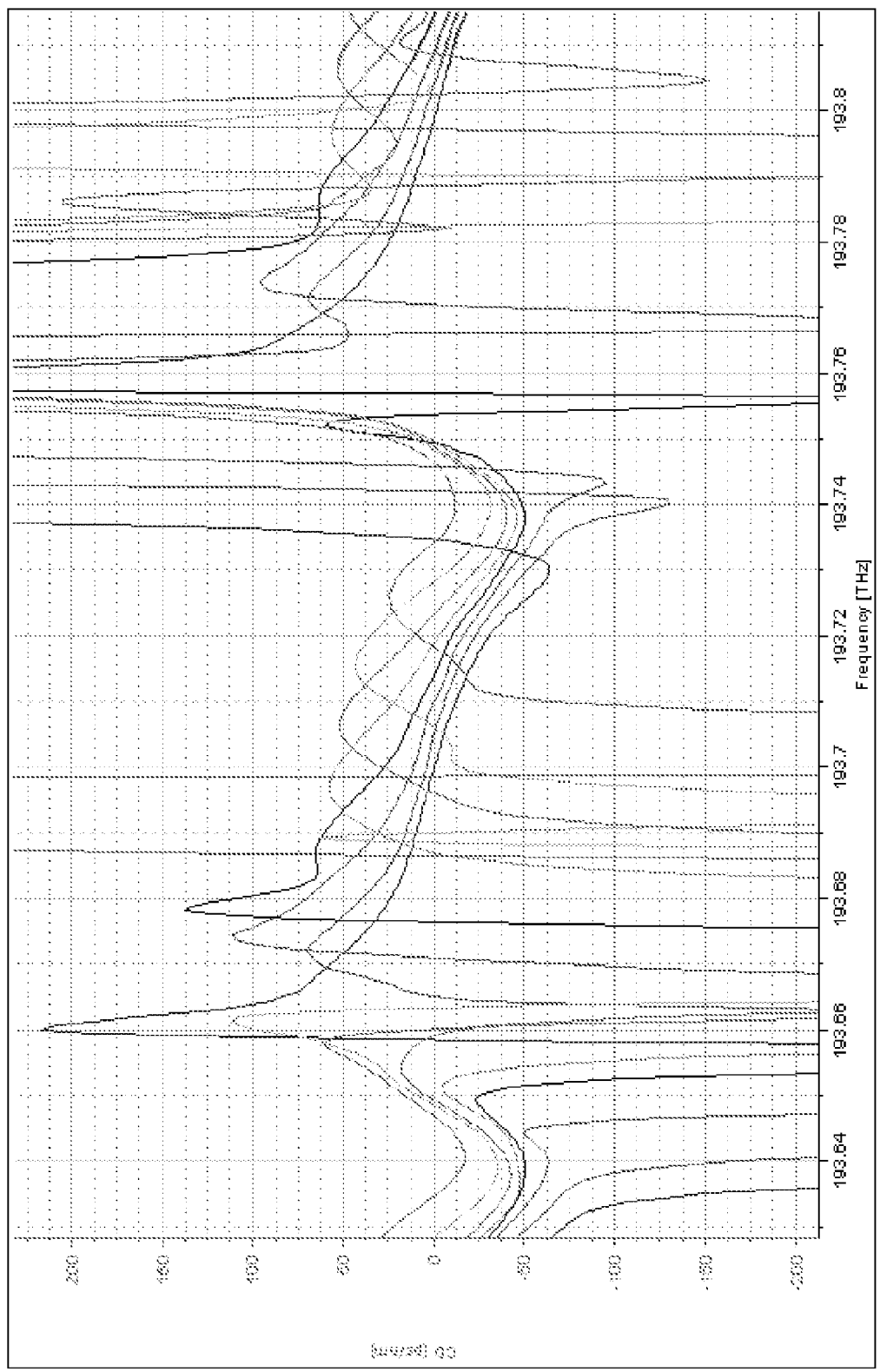
FIG. 23 is a graph showing chromatic dispersion variation at different interleaving ratios.
Figure 24:
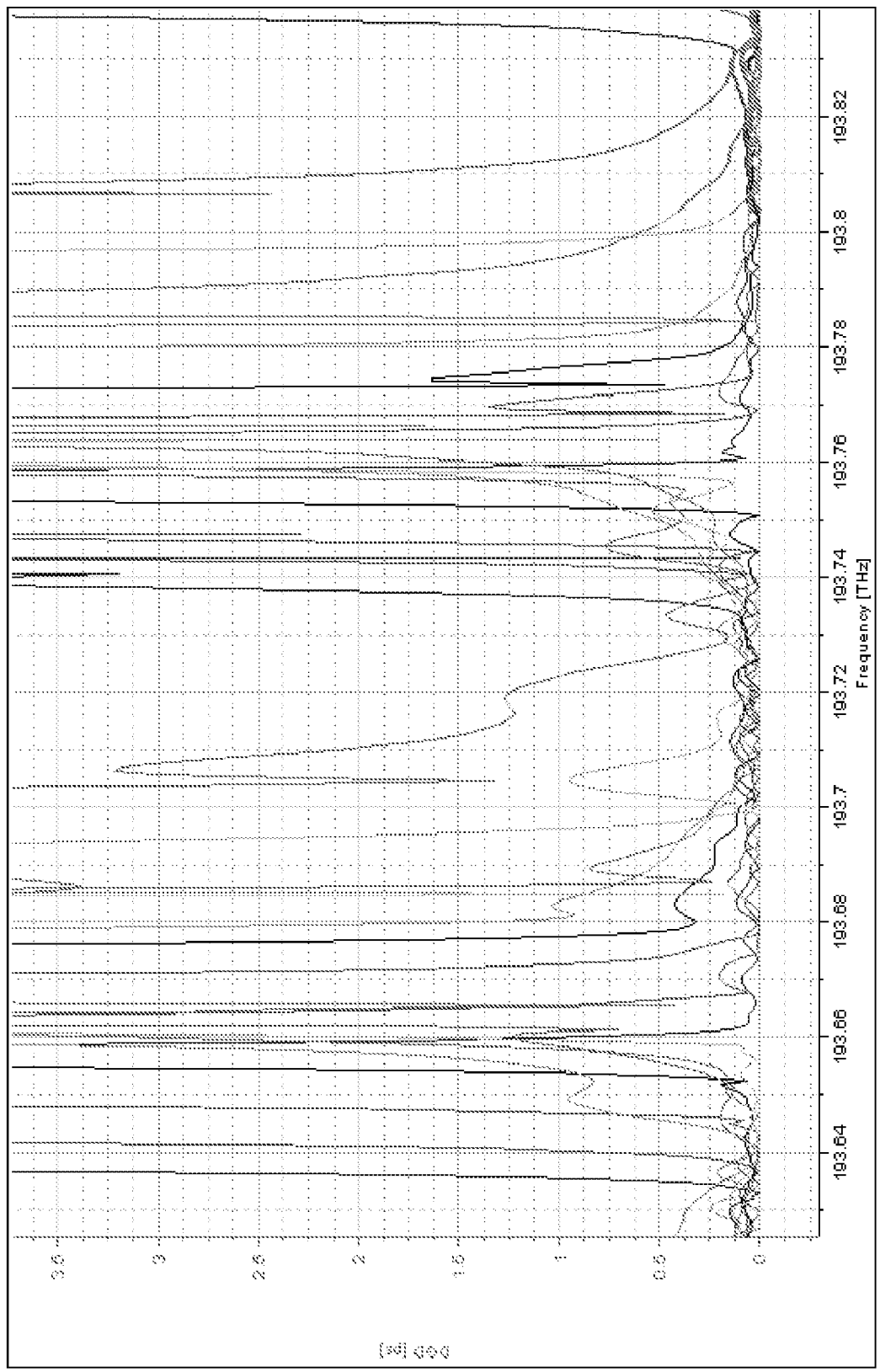
FIG. 24 is a graph showing differential group delay variation at different interleaving ratios.

FIG. 22 shows polarization dependent loss (PDL) curves at 20% to 100% of the FSR for one passband. It is shown that the PDL value increases slightly as the passband narrows. However it is still less than 0.25 dB in the passband. FIGS. 23 and 24 are the chromatic dispersion (CD) and differential group delay (DGD) curves at 20% to 90% of the FSR for the same passband. The result shows that the CD value reduces as the passband narrows. As for the DGD, there is no significant variation with the width of the passband. The maximum DGD within the passband is within 0.12 ps.

Figure 25:
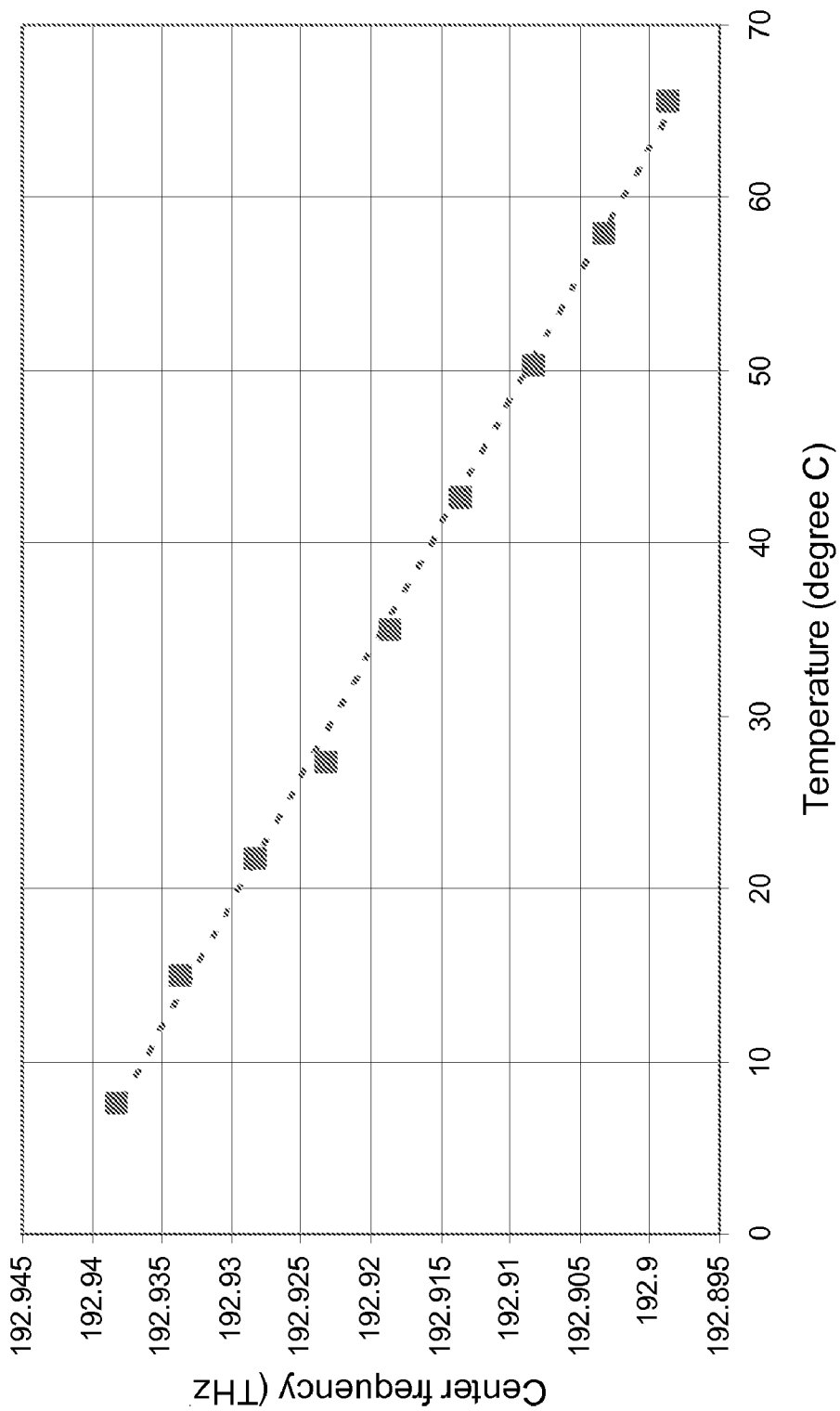
FIG. 25 is a graph showing temperature response of a TAI unit constructed according to the present invention.

A temperature response curve for the experimental TAI according to the present invention is plotted in FIG. 25. The center frequency of one passband is used for Y-axis. A good linear response is observed.

The slope shows that each degree of tuning corresponds to about 688 MHz tuning. Since the thermal controllers available at present can easily provide 0.1° C. temperature resolution and accuracy, frequency tuning resolution of less than 0.1 GHz and center frequency accuracy of within ±0.05 GHz can be achieved. This level is satisfactory for DWDM applications with 50 GHz or higher channel spacing (less than 0.1% frequency jitter).

As prototyped, the experimental TAI exhibits a tuning time of several seconds. This is probably due, in part, to the poor efficiency of the temperature controller circuit used. Advantageously, the tuning time can be reduced to less than a second with higher power source and faster feedback.

The experimental results above show that the constructed TAI prototype can deliver the novel functions and satisfactory optical performance for network applications. Some of the parameters such as passband profile and chromatic dispersion can be improved by using other types of interleaver technology without changing the basic TAI structure.

Applications of Tunable Asymmetric Interleaver

As can now be appreciated by those skilled in the art, a tunable asymmetric interleaver constructed according to the principles of the present invention is applicable to a number of applications in next generation DWDM optical networks.

Interleaved 10 G+40 G DWDM system. As network traffic volume increases, many carriers are drawn to using interleavers to upgrade their optical network because interleaver deployment effectively doubles the WDM channel density. Since most existing DWDM networks have 10 Gbps channels running at 100 GHz channel spacing, by placing 50 G/100 G interleavers in the network, the DWDM network have double the channel number within a given transmission band. To prepare for future traffic growth, most carriers will transmit 40 Gbps traffic (such as OC-768 or STM64) at the added channels. For 100 GHz spaced channels, a legacy 10 Gbps line card may advantageously be used to reduce capital expense until the 10 G+40 G interleaving DWDM network approaches its capacity.

Due to the increase of spectral width for 40 Gbps signal, the existing symmetric interleaver for 50 GHz DWDM channel spacing system cannot provide sufficient passband width. Various new modulation schemes, such as CSRZ-DQPSK, DPolSK and duobinary, have been proposed and evaluated to tackle 0.8 Gbps/Hz bandwidth efficiency by either encoding in two polarizations or by encoding two bits per symbol. However these schemes are still not very efficient and require costly modulators and demodulators.

Figure 26:
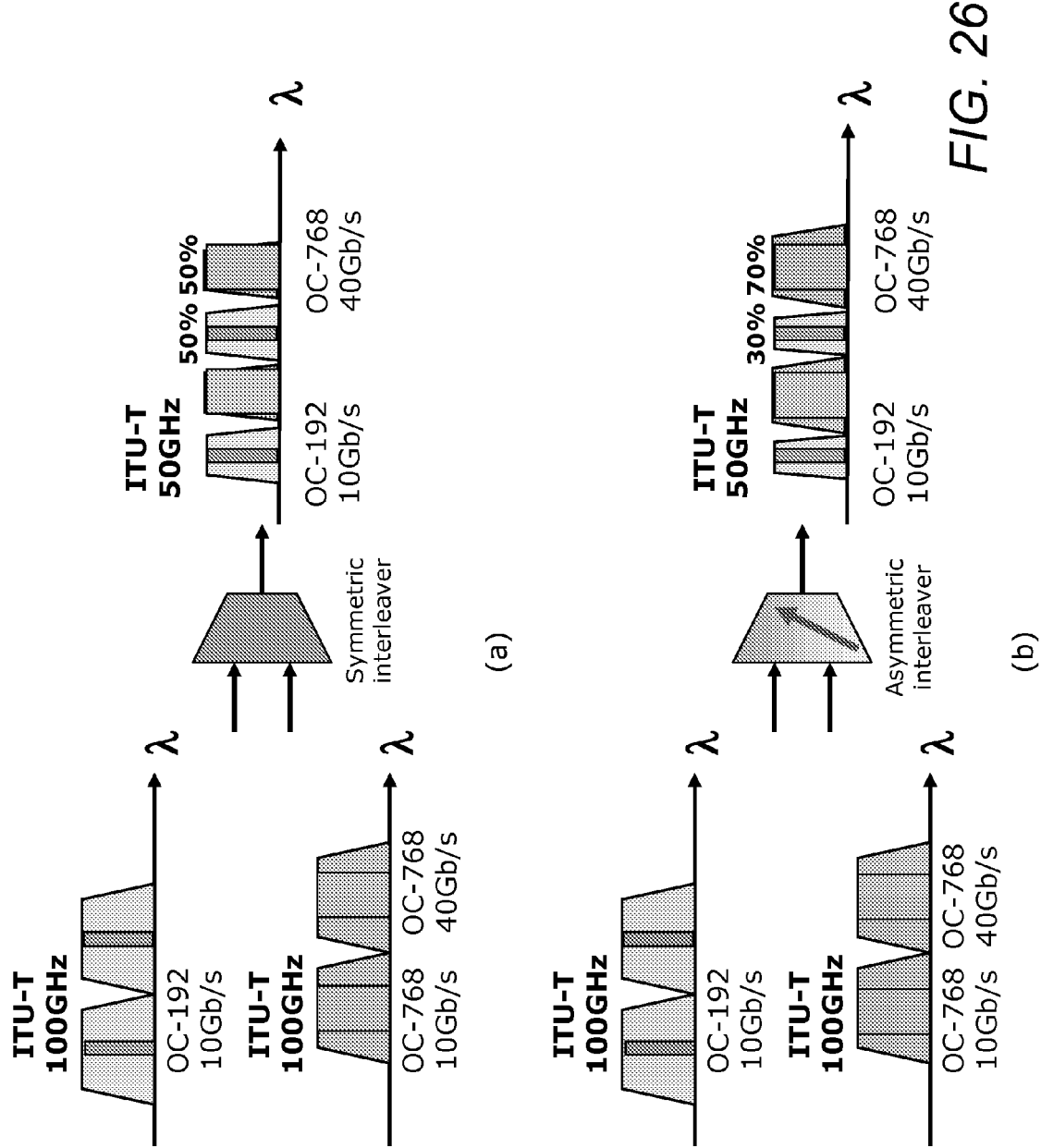
FIG. 26 is a schematic diagram depicting the use of an interleaver for 10 G+40 G DWDM system upgrade employing (a) a symmetric interleaver and (b) an asymmetric interleaver.

Advantageously, TAI provides a low cost solution for the upgrade. As shown on FIG. 26(a), upgrading the channel capacity using symmetric (50:50) interleaver for 50 GHz spacing system will result in insufficient passband width for the 40 Gbps channels. But with asymmetric interleaver with 70:30 interleaving ratio (FIG. 26 (b)), 40 Gbps channels will receive sufficient passband width, while the 10 Gbps channels will not suffer any significant effect.

A fixed asymmetric interleaver can also provide specific asymmetric interleaving ratio (such as 70:30) for 10 G+40 G DWDM system. However with the high resolution tunability provided by the TAI, the interleaving ratio can be fine tuned to reach its optimal position. Also, with tuning capability, the DWDM node and network can be configured for different transmission rate dynamically, such as optimizing between 10 G+10 G and 10 G+40 G systems.

Figure 27:
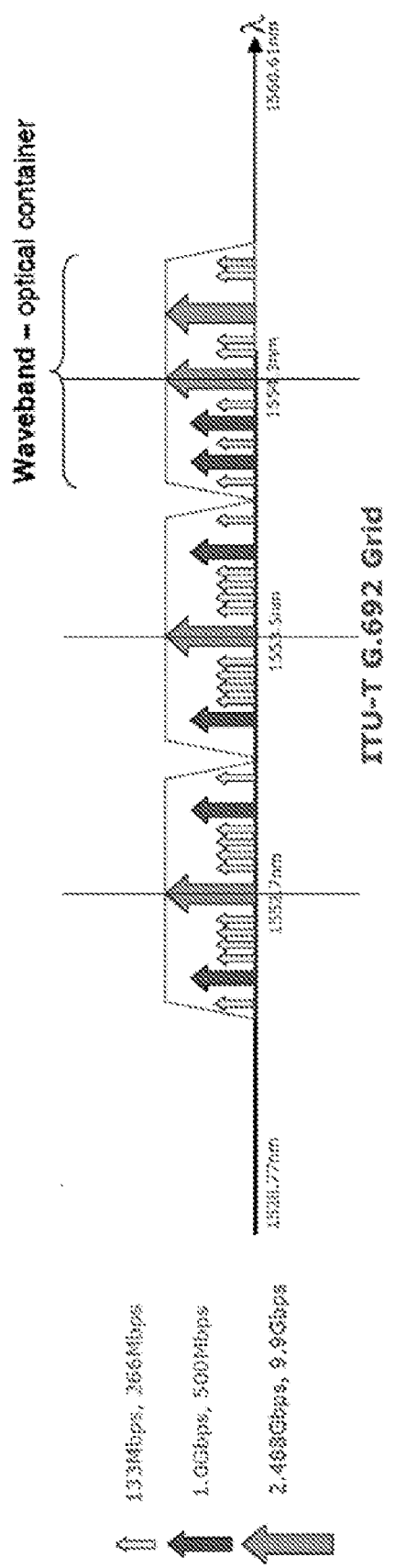
FIG. 27 is a graph depicting VITONET WDM spectrum allocation.
Figure 28:
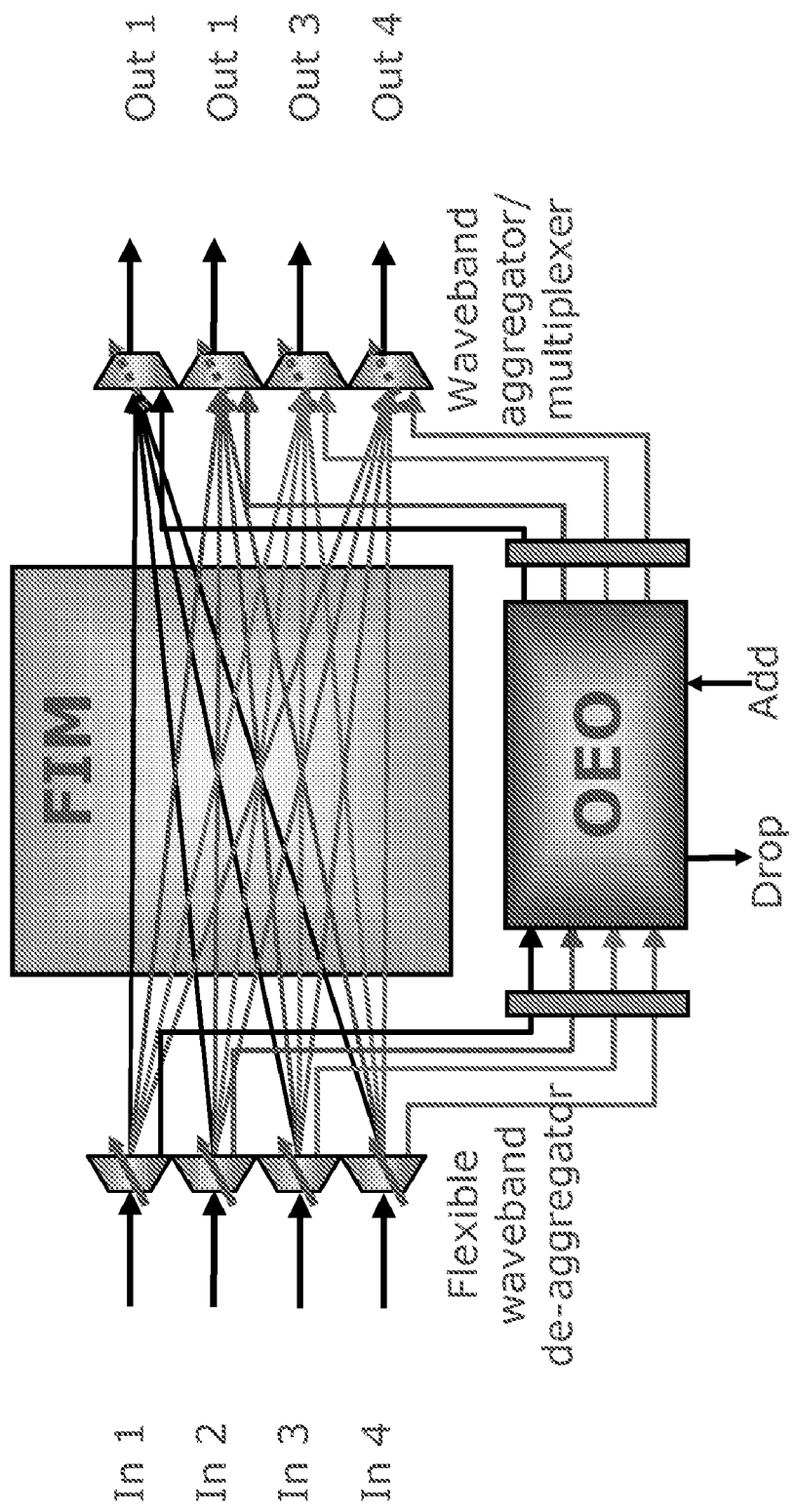
FIG. 28 is a block diagram depicting an next-generation optical cross connect node architecture with FIM and FWDA.

WDM networks with non-standard carriers. Advantageously, TAI is suitable for WDM network architectures having non-standard channel allocation and carrier frequencies. Two examples of such networks are the Variable Channel Spacing Management Strategy and the subsequent Vertically Integrated Transparent Optical Network (VITONET) architecture. The VITONET architecture uses sub-carrier modulation technique to assign transparent optical channels with various signal rates to different users. These transparent channels have lower than 10 Gbps rate and are carried on the ITU-T 100 GHz system (FIG. 27). The neighboring channels around each ITU-T grid form a waveband and are processed together within the "optical container". Due to the dynamic nature of the signal rate and sub-carrier frequency, the interleaver in the network also needs to have configurability. Advantageously, TAI provides a solution for such operation. It should to be noted however, that TAI requires all the Odd and Even channels (wavebands) to have the same passband width respectively.

Figure 29:
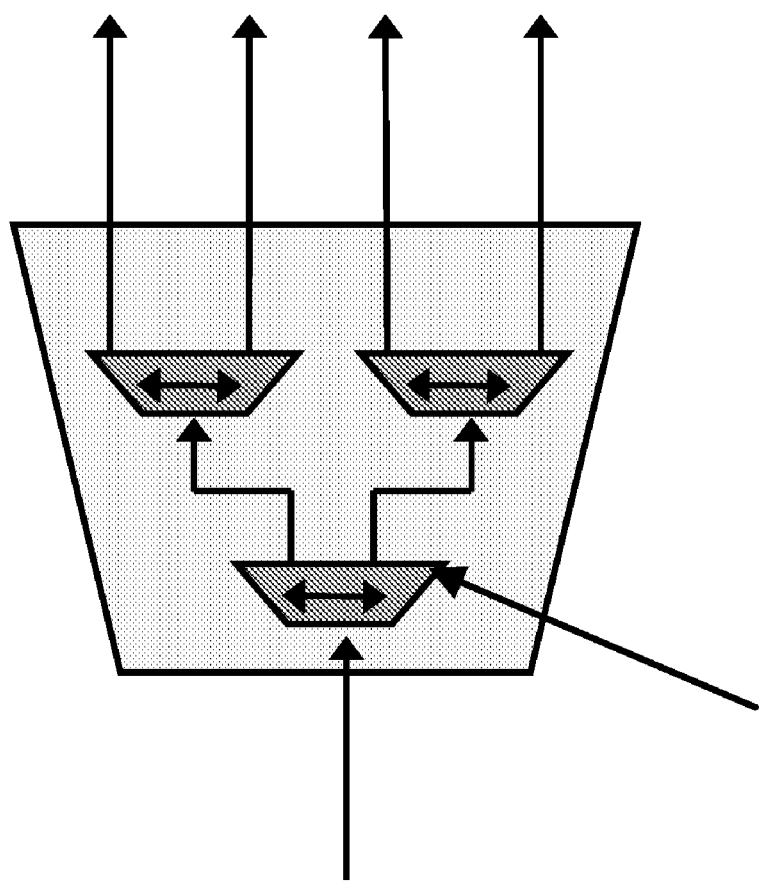
FIG. 29 is a schematic diagram showing the construction of a FWDA using tunable interleavers.

Flexible waveband de-aggregator/aggregator for OXC node. A Waveband De-aggregator/Aggregator (WDA) is a key component in Hybrid Hierarchical Optical Cross-Connect architecture. It advantageously provides most of the switching functions an optical cross-connect node, eliminating the requirement for large scale optical switch. For next generation OXCs, all the switching capability will be shifted to the WDA, leaving a totally passive optical core, namely a Fiber Interconnect Matrix (FIM). The WDA will also provide more switching capabilities compared to the previous fixed WDA and reconfigurable WDA, so it is called the flexible WDA or FWDA. Besides using the Flexible Band Tunable Filter (FBTF), TAI or tunable shift interleaver can also be used to construct the FWDA (FIG. 29). The tunable interleaver-based FWDA has the advantage of no physical moving parts, unlike the stepper motor-based FBTF solution.

We now present some additional background information for certain particularly useful interferometer types.

Michelson Interferometer

Figure 30:
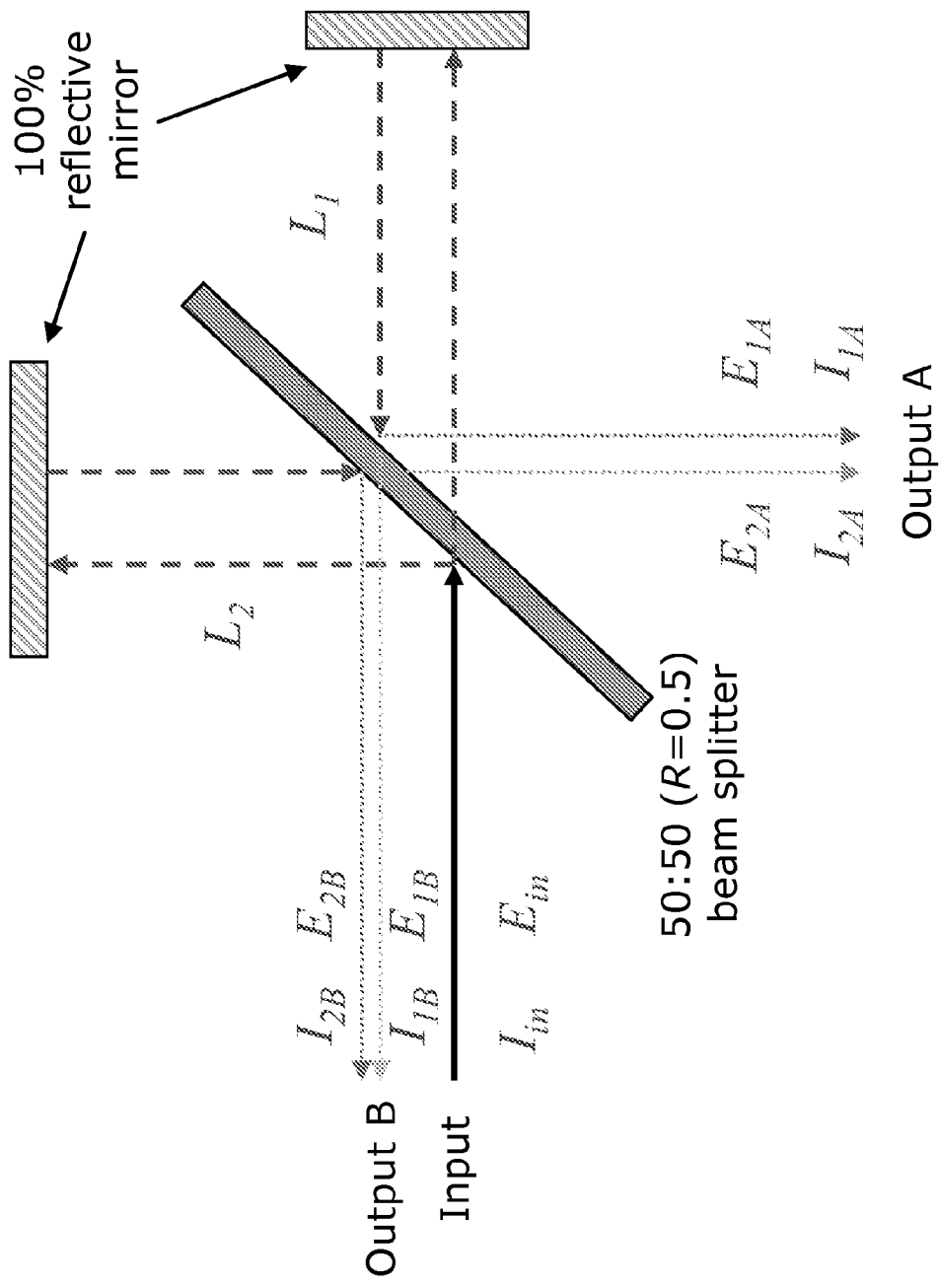
FIG. 30 is a schematic of a Michelson interferometer.

The Michelson interferometer produces interference fringes by splitting a beam of monochromatic light into two beams propagating in perpendicular directions, each one of the two beams strikes a mirror and reflects back. When the reflected beams are brought back together by a beam splitter/combiner, an interference pattern results. The schematic of a Michelson interferometer is shown schematically in FIG. 30.

For a semi-reflective 50:50 beam splitter placed at 45° angle of the incident beam, the reflectivity value R=0.5, so the reflected components are:

$$|\tilde{E}_{1A}| = \sqrt{R}\sqrt{1-R}|\tilde{E}_{in}| = \sqrt{0.5}\sqrt{0.5}|\tilde{E}_{in}| = 0.5|\tilde{E}_{in}|$$
$$|\tilde{E}_{1B}| = \sqrt{1-R}\sqrt{1-R}|\tilde{E}_{in}| = \sqrt{0.5}\sqrt{0.5}|\tilde{E}_{in}| = 0.5|\tilde{E}_{in}|$$
$$|\tilde{E}_{2A}| = \sqrt{1-R}\sqrt{R}|\tilde{E}_{in}| = \sqrt{0.5}\sqrt{0.5}|\tilde{E}_{in}| = 0.5|\tilde{E}_{in}|$$
$$|\tilde{E}_{2B}| = \sqrt{R}\sqrt{R}|\tilde{E}_{in}| = \sqrt{0.5}\sqrt{0.5}|\tilde{E}_{in}| = 0.5|\tilde{E}_{in}|$$

Therefore the intensity at Output A is:

$$I_A = |\tilde{E}_{1A} + \tilde{E}_{2A}|$$
$$= (\tilde{E}_{1A} + \tilde{E}_{2A})(\tilde{E}_{1A}^* + \tilde{E}_{2A}^*)$$
$$= 0.25|\tilde{E}_{in}|^2 + 0.25|\tilde{E}_{in}|^2 + 0.5|\tilde{E}_{in}||\tilde{E}_{in}|(e^{i(\phi_{1A}-\phi_{2A})} + e^{i(\phi_{2A}-\phi_{1A})})$$
$$= 0.5|\tilde{E}_{in}|^2(1 + \cos\Delta\phi_A)$$

Similarly: $I_B = 0.5|\tilde{E}_{in}|^2(1+\cos\Delta\phi_B)$

Because energy is conserved, we have: $I_{in} = I_A + I_B$. And since $I_{in} = |\tilde{E}_{in}|^2$, we get: $\cos\Delta\phi_A + \cos\Delta\phi_B = 0$, where $$\Delta\phi_A = \frac{4\pi}{c}f(L_1 - L_2) + \phi_A$$

Figure 31:
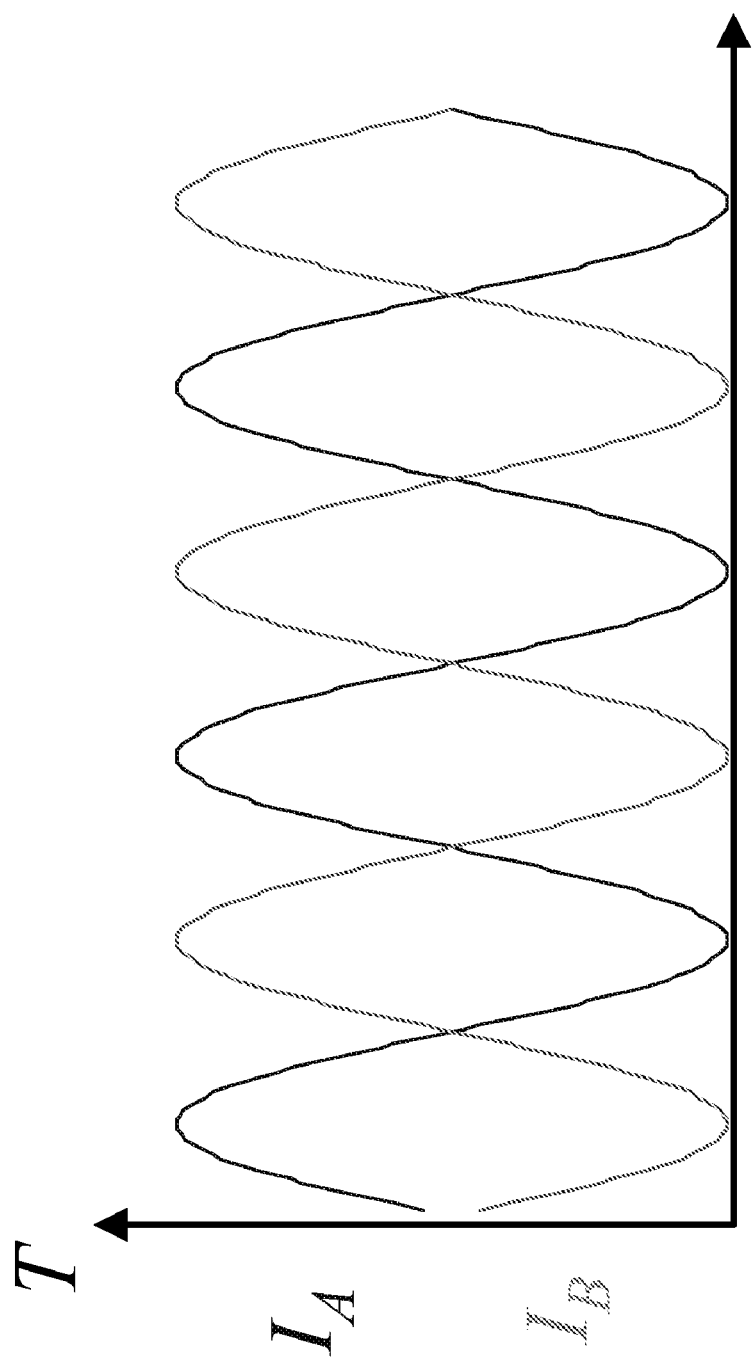
FIG. 31 is a graph showing the periodic outputs of the Michelson interferometer of FIG. 30.

Therefore $\Delta\phi_A = k\pi + \Delta\phi_B$ where k is an odd integer. This means that $\Delta\phi_A$ and $\Delta\phi_B$ are (odd number of) π out of phase. In other words, outputs A and B are complementary. Due to constructive and destructive interference that govern the transmission function, their outputs are periodic in frequency (FIG. 31). A 1×2 (or 2×2) interleaver is thus constructed.

Gires-Tournois Resonator

A Gires-Tournois resonator or etalon is a special type of Fabry-Perot interferometer/etalon, because its 2 surfaces have different reflectivity. One of the surfaces is highly reflective with reflectivity close to ideal value of 1, while the other surface has lower reflectivity. Therefore a G-T resonator is sometimes also called an asymmetric F—P interferometer/etalon. (In strict technically definition, etalon is different from interferometer. Etalon structure refers to a transparent plate with 2 reflective surfaces, while interferometer refers to 2 parallel highly-reflective mirrors. However the terminology is often used inconsistently.)

Figure 32:
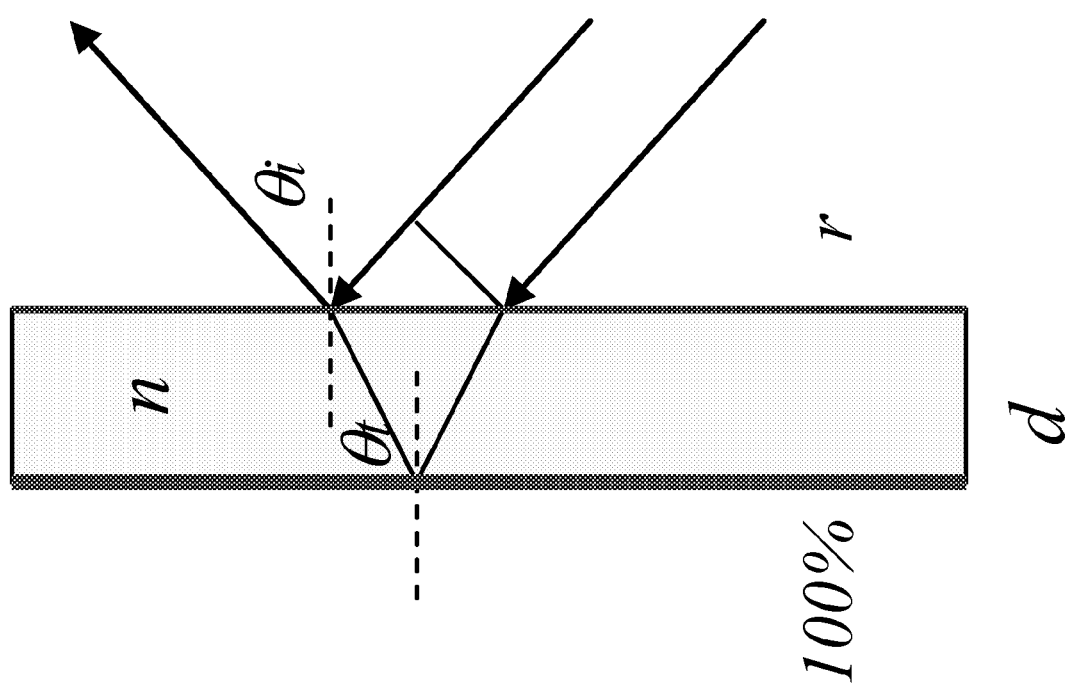
FIG. 32 is a schematic of a Gires-Tournois etalon.

FIG. 32 shows a schematic of a G-T etalon. One of the surface has ideal 100% reflectivity, the other surface has complex amplitude reflectivity of r (r<100%). Due to multiple-beam interference, light incident on the lower reflectivity surface of a Gires-Tournois etalon is (almost) completely reflected, but has a phase shift that depends strongly on the wavelength of the light.

The complex amplitude reflectivity of a Gires-Tournois etalon is given by:

$$R = \frac{r - e^{-i\delta}}{1 - re^{-i\delta}}$$

where $$\delta = \frac{2\pi}{\lambda}nd\cos\theta_t$$

and n is the refractive index the media, $$n = \frac{\sin\theta_i}{\sin\theta_t}$$

d is the length of the resonating cavity (thickness of the plate)

$\theta_t$ is the angle of refraction the light makes within the plate, and

λ is the wavelength of the light.

For special case r=100%, $$\Delta\phi = \frac{2\pi}{\lambda}\left(2\frac{dn}{\cos\theta_t} - 2d\tan\theta_t\sin\theta_i\right)$$
$$= \frac{4\pi d}{\lambda}\left(\frac{n}{\cos\theta_t} - \frac{\sin\theta_t}{\cos\theta_t}n\sin\theta_t\right)$$
$$= \frac{4\pi dn}{\lambda}\cos\theta_t$$

For normal incidence, $\theta_t=0$, therefore $$\Delta\phi = \frac{4\pi dn}{\lambda}.$$

For constructive interference, $\Delta\phi = m\cdot 2\pi$ where m is an integer. Therefore:

$$m\cdot 2\pi = \frac{4\pi dn}{\lambda_m} = 4\pi dn\frac{f_m}{c}$$

And so $$f_m = m\frac{c}{2dn}$$

Define FSR $$f_0 = \frac{c}{2dn}$$

thus $f_m = m\cdot f_0$. And therefore:

$$\Delta\phi = \frac{4\pi dn}{\lambda_m} = 2\pi\frac{f}{\frac{c}{2dn}} = 2\pi\frac{f}{f_0} = 2\pi\frac{f}{f_m/m}$$

As now apparent to those skilled in the art, a tunable asymmetric interleaver exhibiting continuous interleaving ratio tuning has been described at length. And while designs described include two symmetric interleavers in series wherein either or both of them exhibit a wavelength shifting capability, the interleaver components employed may advantageously constructed using any of a number of different technologies ranging from simple M-Z or Michelson interferometer to AWG-based interleaver to resonance-based interferometers. Similar flexible variations with supporting structures are likewise possible. Accordingly, our invention should be only limited by the scope of the claims attached hereto.

What is claimed is:

1. An optical apparatus comprising:
    a 1×2 tunable shift interleaver having a free spectral range (FSR) of 2X at its input and FSR of 4X at its output;
    a 2×2 cyclic tunable shift interleaver optically connected in series with the 1×2 tunable shift interleaver, said 2×2 cyclic tunable shift interleaver having a FSR of 2X at its input and FSR of 4X at is output;
    wherein the optical apparatus is configured to produce an output optical signal exhibiting an asymmetric passband width ratio upon application of an input optical signal;
    wherein said optical apparatus has a FSR of X at its input and an FSR of 2X at its output.

2. The optical apparatus of claim 1 wherein said output optical signal comprises even and odd outputs wherein the entire spectra of the output signal is distributed between said even and odd outputs.

3. The optical apparatus of claim 1 wherein the combination of the odd and even outputs comprise the entire output spectrum.

4. The optical apparatus of claim 1 wherein a center frequency for each of the odd and even outputs is maintained to correspond to that of a standard ITU-T grid.

5. The optical apparatus of claim 1 wherein said passband width ratio is tunable such that the optical apparatus may produce an asymmetric passband width ratio from 0:100, to 50:50, to 100:0.

6. In an optical communications network employing a Dense Wavelength Division Multiplexing scheme to enhance the capacity of the network, an upgrade method comprising the steps of:
    providing an optical apparatus to a transmitter within the network, said optical apparatus including:
    a 1×2 tunable shift interleaver; and
    a 2×2 cyclic tunable shift interleaver optically connected in series with the 1×2 tunable shift interleaver;
    wherein the optical apparatus is configured to produce an output optical signal exhibiting an asymmetric passband width ratio upon application of an input optical signal;
    wherein said optical apparatus has a free spectral range (FSR) of X at its input and an FSR of 2X at its output; the 2×2 interleaver has an FSR of 2X at its input and an FSR of 4X at its output; and the 1×2 tunable shift interleaver has an FSR of 2X at its input and an FSR of 4X at its output.

7. The method of claim 6 wherein said output optical signal comprises even and odd outputs wherein the entire spectra of the output signal is distributed between said even and odd outputs and the combination of the odd and even outputs comprise the entire output spectrum.

8. The optical apparatus of claim 7 wherein a center frequency for each of the odd and even outputs is maintained to correspond to that of a standard ITU-T grid.

9. The optical apparatus of claim 8 wherein said passband width ratio is tunable such that the optical apparatus may produce an asymmetric passband width ratio from 0:100, to 50:50, to 100:0.

* * * * *